(12) United States Patent
Osawa et al.

(10) Patent No.: US 8,876,929 B2
(45) Date of Patent: Nov. 4, 2014

(54) FILTER DEVICE

(75) Inventors: Kazuhiko Osawa, Tokyo (JP); Ichiro Okawara, Saitama (JP); Shinichi Kitano, Saitama (JP); Michio Omata, Saitama (JP); Shinichirou Takemoto, Kanagawa (JP)

(73) Assignees: Kabushiki Kaisha Saginomiya Seisakusho, Tokyo (JP); Nissan Motor Co., Ltd, Kanagawa (JP)

( * ) Notice: Subject to any disclaimer, the term of this patent is extended or adjusted under 35 U.S.C. 154(b) by 202 days.

(21) Appl. No.: 13/574,285

(22) PCT Filed: Dec. 22, 2010

(86) PCT No.: PCT/JP2010/073207
§ 371 (c)(1),
(2), (4) Date: Jul. 20, 2012

(87) PCT Pub. No.: WO2011/089821
PCT Pub. Date: Jul. 28, 2011

(65) Prior Publication Data
US 2012/0285131 A1 Nov. 15, 2012
US 2014/0069066 A2 Mar. 13, 2014

(30) Foreign Application Priority Data
Jan. 21, 2010 (JP) .................................. 2010-010870

(51) Int. Cl.
*B01D 41/00* (2006.01)
*H01M 8/04* (2006.01)
*H01M 8/10* (2006.01)

(52) U.S. Cl.
CPC ............ *H01M 8/04253* (2013.01); *Y02T 90/32* (2013.01); *H01M 2008/1095* (2013.01); *H01M 2250/20* (2013.01); *H01M 8/04164* (2013.01); *Y02E 60/50* (2013.01); *H01M 8/04097* (2013.01)
USPC ....... 55/300; 210/360.1; 210/380.1; 210/381; 210/393; 210/407

(58) Field of Classification Search
CPC . B01D 46/0075; B01D 46/04; H01M 8/4097; H01M 8/4253
USPC .............. 55/300; 210/360.1, 380.1, 381, 393, 210/407
See application file for complete search history.

(56) References Cited

U.S. PATENT DOCUMENTS

| 2,541,202 | A | * | 2/1951 | Caldwell | 210/222 |
| 5,667,682 | A | * | 9/1997 | Laird | 210/407 |
| 2010/0071781 | A1 | * | 3/2010 | Hatta | 137/334 |

FOREIGN PATENT DOCUMENTS

| JP | 3-36110 A | 2/1991 |
| JP | 3-52183 A | 3/1991 |

(Continued)

OTHER PUBLICATIONS

International Search Report mailed Feb. 22, 2011 in corresponding PCT application No. PCT/JP2010/073207, 13 pages.

(Continued)

*Primary Examiner* — Jason M Greene
*Assistant Examiner* — Karla Hawkins
(74) *Attorney, Agent, or Firm* — Yukiko O. Maekawa

(57) ABSTRACT

A filter device disposed in a moist fluid passage of the fuel cell system includes a fluid introducing path which introduces a fluid that flows in the moist fluid passage, a filter to permeate the fluid introduced from the fluid introducing path and remove foreign matter in the fluid, a fluid discharge path which discharges a fluid that passed the filter, and a rotating driving mechanism, connected with the filter, that rotates the filter so that substances that adheres to the filter are removed by the centrifugal force. In the filter device, water does not adhere to and does not remain in the filter. When leaving the system under the low temperature after the system stops, blockage by freezing the filter can surely be prevented. The complex control and the heat source such as a heater for defrost is unnecessary. Thus, a cheap and compact filter device can be provided.

16 Claims, 27 Drawing Sheets

(56) References Cited

FOREIGN PATENT DOCUMENTS

| | | | |
|---|---|---|---|
| JP | 5-329400 | A | 12/1993 |
| JP | 6-14733 | U | 2/1994 |
| JP | 10-26469 | A | 1/1998 |
| JP | 10-223246 | A | 8/1998 |
| JP | 2007-216151 | A | 8/2007 |
| JP | 2008-157289 | A | 7/2008 |
| JP | 2008-270151 | A | 11/2008 |
| WO | 2008-114120 | A1 | 9/2008 |

OTHER PUBLICATIONS

International Preliminary Report on Patentability Chapter II mailed Feb. 14, 2012 in corresponding PCT application No. PCT/JP2010/073207, 11 pages.

Wrriten Opinion of the International Search Authority mailed Feb. 22, 2011 in corresponding PCT application No. PCT/JP2010/073207, 4 pages.

English Translation of International Preliminary Report on Patentability Chapter II mailed Feb. 14, 2012 in corresponding PCT Application No. PCT/JP2010/073207, 5 pages.

\* cited by examiner

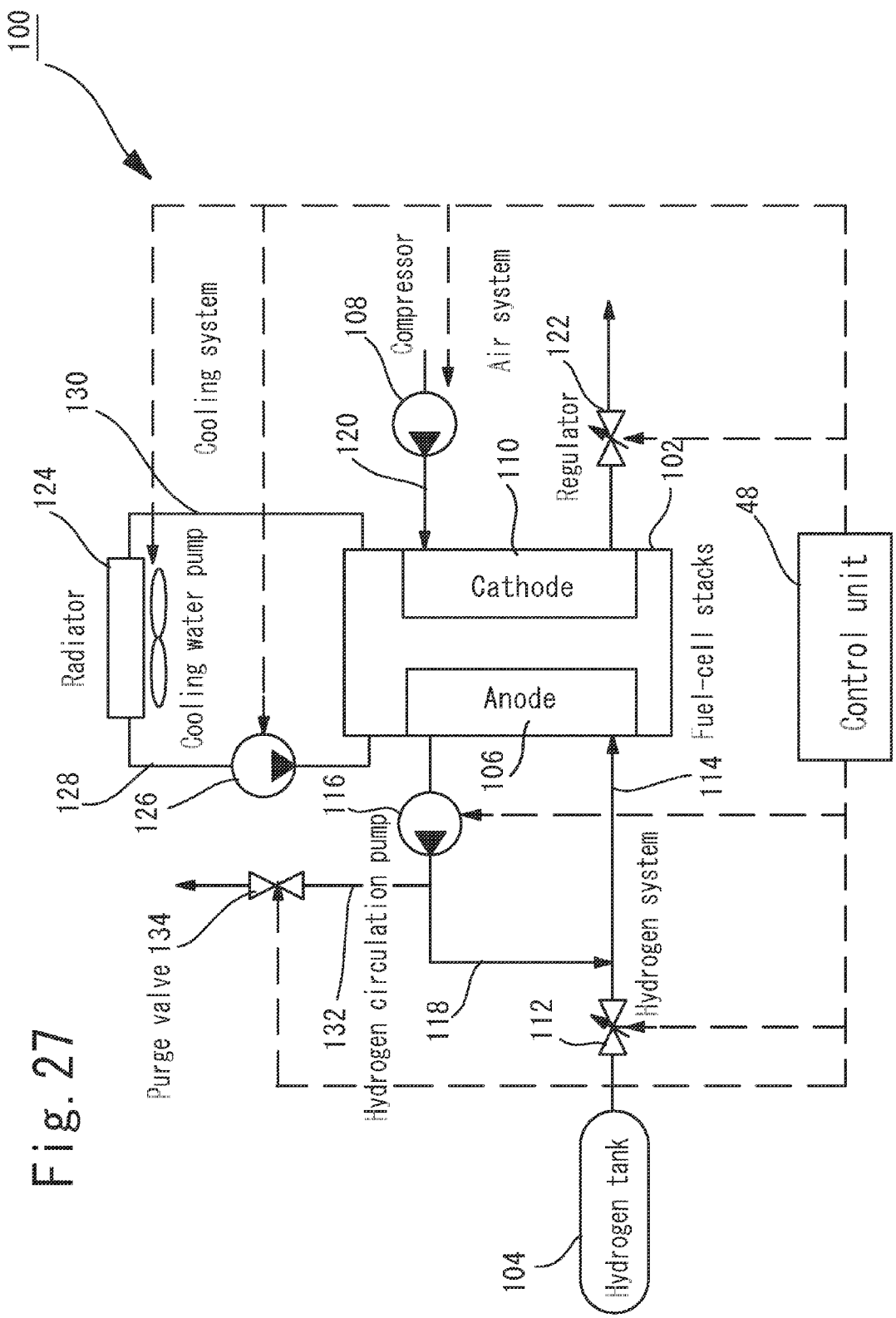

FILTER DEVICE

The present application is a national stage of the PCT Application No. PCT/JP2010/073207 filed Dec. 22, 2010, which claims priority to Japanese Patent Application No. JP 2010-010870 filed Jan. 21, 2010, the disclosure of which are hereby incorporated by reference.

TECHNICAL FIELD

The invention relates to a filter device disposed in a moist fluid passage of the fuel cell system. In particular, the invention relates to the filter device which is disposed at the upstream side of the purge valve that opens and shuts the passage of the moist fluid, and the invention relates to a suitable filter device as a filter to remove foreign substances in the fluid.

BACKGROUND ART

Conventionally, global environmental problems such as a global warming are recognized. In place of a car using fossil fuel such as gasoline that exhausts carbon dioxide which causes global warming, recently, a vehicle such as an electric vehicle that uses the fuel cell is noted.

As such a fuel cell system, the fuel cell system, of which a schematic diagram is shown in outline in FIG. 27, is adopted.

That is, fuel cell system 100 of FIG. 27 includes fuel cell stack 102 that is the main body of the solid polymer type fuel cell.

In this fuel cell stack 102, an anode 106 (hydrogen pole), in which the hydrogen gas that is the fuel gas is supplied from hydrogen tank 104 that is the fuel gas supply source, is provided. Moreover, in the fuel cell stack 102, a cathode (air pole) 110, in which an air that is the oxidant gas is supplied through compressor 108, is provided.

The hydrogen gas, that is the fuel gas, is stored, as a high-pressure hydrogen gas, in a hydrogen tank 104. The high-pressure hydrogen gas supplied from hydrogen tank 104 is decompressed to the driving pressure of the fuel cell by a hydrogen pressure adjustment valve 112. The high-pressure hydrogen gas is supplied to the anode 106 through a hydrogen supply passage 114.

The surplus hydrogen gas, which is not consumed by the anode 106, is returned to the hydrogen supply passage 114 by a hydrogen circulation passage 118 through a hydrogen circulation pump 116. The surplus hydrogen gas is mixed with the hydrogen gas which is supplied from the hydrogen tank 104, and is supplied to the anode 106.

On the other hand, air as the oxidant gas is compressed through a compressor 108 through the air filter not shown in the figure, and the compressed air is supplied to the cathode 110 through an air supply passage 120.

In addition, oxygen in the air is used to react at the cathode 110, and the remaining air is exhausted through an air pressure adjustment valve 122 that adjusts the air pressure.

Moreover, in the fuel cell stack 102, in order to keep the temperature of the fuel cell stack 102 at the predetermined temperature, the cooling system, in which the cooling fluid such as cooling water is circulated around, is provided. That is, the cooling fluid cooled down with radiator 124 is circulated to cool the fuel cell stack 102 through a cooling water circulation path 128, 130 by a cooling water pump 126.

Moreover, in the hydrogen circulation passage 118, a discharge path 132 is diverged to exhaust to the outside the nitrogen gas and the like included in the surplus hydrogen gas.

For instance, a purge valve 134 for opening and shutting this discharge path 132 with an electromagnetic valve is disposed.

By the way, since impurities such as foreign matter may be contained in the fluid that flows in the hydrogen circulation passage 118, the filter is provided in the purge valve 134 in the discharge path 132.

For example, there is Patent Literature 1 (JP, 2008-270151, A) as a fuel cell system that disposes a filter in the purge valve 134 on such a discharge path 132.

CITATION LIST

Patent Literature

Patent Literature 1: JP, 2008-270151, A

SUMMARY OF INVENTION

Problem to be Solved

However, in the fuel cell system that installs such a conventional filter, when moisture content such as steam is contained in the fluid, the moisture content may be condensed in the passage and water may be accumulated. In particular, in the filter of the purge valve 134 of the discharge path 132, water adheres easily to the mesh portion. Therefore, when leaving the system under the low temperature after the system stops, the water in the filter freezes and discharge path 132 is blockaded.

In view of considering such a current state, the object of the invention is to provide a filter device disposed in the moist fluid passage of the fuel cell system, wherein water is not adhered to and does not remain in the filter and when leaving the system under the low temperature after the system stops, blockage by freezing the filter can surely be prevented in the event that the fuel cell system starts.

Means for Solving Problem

The invention was invented to achieve the problem and the purpose in the above-mentioned prior art, the filter device of the invention is a filter device disposed in a moist fluid passage of a fuel cell system, the filter device includes:

a fluid introducing path which introduces a fluid that flows in the moist fluid passage, a filter to permeate the fluid introduced from the fluid introducing path and remove foreign matter in the fluid, a fluid discharge path which discharges a fluid that passed the filter, and vibrating means that vibrates the filter.

In this Specification, "vibrate" in "vibrating means that vibrates the filter" includes the meanings of a centrifugal force by rotation (rotating vibration), a rotating eccentric vibration (the vibration including centrifugal force by rotation and centrifugal force by eccentricity), and vertical vibration.

By the composition like this, the filter is vibrated, and the moisture content that adheres to the filter is flicked out by the vibration so that the moisture content can be removed.

Thus, thereafter, even if the filter device is left under the low temperature, since the moisture content that becomes the origin of ice does not exist, clogging with ice is not caused. Moreover, by the vibration of the filter, impurities such as the dust that adhere to the filter are flicked out at the same time by the vibration so that the impurities can be removed.

As a result, water does not adhere to and does not remain in the filter, and when leaving the system under the low temperature after the system stops, blockage by freezing the filter can surely be prevented. Therefore, the filter device disposed in the moist fluid passage of the fuel cell system can be provided.

Moreover, the filter device of the invention is characterized in that the vibration means is a rotating driving mechanism which is connected to rotate and vibrate the filter.

By the composition like this, the filter is rotated by the rotating driving mechanism so that, by the centrifugal force (rotating vibration), the moisture content that adheres to the filter is flicked out by the centrifugal force and whereby the moisture content can be removed.

Thus, thereafter, even if the filter device is left under the low temperature, since the moisture content that becomes the origin of ice does not exist, clogging with ice is not caused. Moreover, by the vibration of the filter, impurities such as the dust that adhere to the filter are flicked out at the same time by the centrifugal force so that the impurities can be removed.

As a result, water does not adhere to and does not remain in the filter, and when leaving the system under the low temperature after the system stops, blockage by freezing the filter can surely be prevented. Therefore, the filter device disposed in the moist fluid passage of the fuel cell system can be provided.

Moreover, the filter device of the invention is characterized in that the rotating driving mechanism is a blade member which is disposed in the fluid introducing path and is rotated by the fluid introduced into the fluid introducing path.

By the composition like this, the blade member is rotated with the fluid introduced into the fluid introducing path. As a result, since the filter connected with this blade member rotates so that other piping and power supplies are unnecessary. Therefore, a cheap and compact filter device can be provided.

Moreover, the filter device of the invention is characterized in that the rotating driving mechanism is a rotation motor.

By the composition like this, when the filter is desired to be rotated for the predetermined time by using the rotation motor, for instance, the filter can be controlled to be rotated only for a fixed time on a process of the system termination. As a result, the duration of life of the rotating driving mechanism that rotates filter can be prolonged.

Moreover, the filter device of the invention includes:

a rotation magnet for drive which is connected to the rotating driving mechanism side, and a magnet for rotation which is connected to the filter, and the filter device is characterized in that the filter is rotated by magnet coupling between the rotation magnet for drive and the magnet for rotation.

By the composition like this, even when the filter cannot rotate due to the ice, etc., the motor does not enter the locked state so that the overcurrent of the motor can be prevented from damaging.

Moreover, the filter device of the invention is characterized in that a partition member for airtightly separating is disposed between the rotation magnet for drive and the magnet for rotation.

By the composition like this, against hydrogen which is a small size of the molecule and is easy to leak, a complete sealing structure can be formed without providing a complex sealing structure. To the motor drive portion, deterioration by the hydrogen brittleness caused by contact of hydrogen with a metallic member can be prevented.

Moreover, the filter device of the invention is characterized in that the rotating driving mechanism is a blade member that rotates by introducing a fluid for rotation drive.

By the composition like this, the blade member is rotated with the cooling fluid which is introduced into the cooling fluid divergence path such as a radiator. As a result, the filter connected to this blade member rotates so that the cooling fluid of the cooling fluid circulation path can be used for rotating. Therefore, the filter can be rotated without being limited to the amount of the purge of the purge valve so that moisture content can be surely flicked out and be removed by the centrifugal force.

Moreover, the filter device of the invention is characterized in that the rotating driving mechanism includes:

a rack member which is reciprocated by introducing a fluid for rotation drive, and a pinion member which is connected to the filter and is rotated by movement of the rack member, being engaged with the rack member.

By the composition like this, the rack member reciprocates by introducing the fluid for the rotation drive and the pinion member is rotated by movement of the rack member. As a result, since the filter connected with this pinion member rotates so that the fluid for rotation drive can be used for rotating. Therefore, the filter can be rotated without being limited to the amount of the purge of the purge valve so that moisture can be surely flicked out and be removed by the centrifugal force.

Moreover, the filter device of the invention is characterized in that the fluid for rotation drive is a fluid for the rotation drive which is introduced through the cooling fluid divergence path that diverges from the cooling fluid circulation path.

By the composition like this, the blade member and the pinion member are rotated with the cooling fluid which is introduced into the cooling fluid divergence path. As a result, the filter rotates so that the cooling fluid of the cooling fluid circulation path can be used for rotating. Therefore, the filter can be rotated without being limited to the amount of the purge of the purge valve so that moisture can be surely flicked out and be removed by the centrifugal force.

Moreover, the filter device of the invention is characterized in that a rotation shaft of the filter and a rotation shaft of the rotating driving mechanism are connected mutually in the state of eccentricity so that the filter is rotating and vibrated eccentrically.

By the composition like this, by rotating of the rotating driving mechanism, the filter, which is connected with the rotation shaft of the rotating driving mechanism in the state of eccentricity, is vibrated by rotation eccentricity. As a result, by a vibration in which centrifugal force by rotation and centrifugal force by eccentricity is joined together, the filter is vibrated. Consequently, the moisture content that adheres to the filter is flicked out by the vibration so that the moisture content can be effectively removed.

Moreover, the filter device of the invention is characterized in that the vibrating means is a vertical vibrating mechanism which is connected to vibrate the filter vertically.

By the composition like this, the filter is vibrated vertically by the vertical vibrating mechanism. As a result, the moisture content which is adhered to the filter is flicked out vertically by the vibration so that the moisture content can be effectively removed.

Moreover, the filter device of the invention is characterized in that the vertical vibrating mechanism vibrates the filter vertically by the piezoelectric element.

By the composition like this, by applying a current to the piezoelectric element, the vibration of the piezoelectric element becomes a vertical vibration and is transmitted so that the filter can be vibrated vertically. Consequently, the filter can be vibrated vertically and as a result, the moisture content which is adhered to the filter is flicked out vertically by the vertical vibration of the filter so that the moisture content can be effectively removed.

Moreover, since it is enough to dispose the piezoelectric element, other piping is unnecessary, and the power consumption to the piezoelectric element is little so that a cheap and compact filter device can be provided.

Moreover, the filter device of the invention is characterized in that, the vertical vibrating mechanism comprises:

a filter side magnet connected to the filter, and a driving side magnet disposed to face the filter side magnet, wherein the filter is vertically vibrated by the repulsion power of the filter side magnet and driving side magnet.

By composing like this, the filter can be vertically vibrated by the repulsion power of the filter side magnet and driving side magnet. As a result, the moisture content which is adhered to the filter is flicked out vertically by the vertical vibration of the filter so that the moisture content can be effectively removed.

Moreover, since it is enough to dispose the filter side magnet and driving side magnet, other piping and the power supply are unnecessary, so that a cheap and compact filter device can be provided.

Moreover, the filter device of the invention is characterized in that, a driving side magnet is formed at a part in the rotating direction of a rotating body which is connected to a rotation motor.

By composing like this, the driving side magnet is formed at a part in the rotating direction of the rotating body which is connected to the rotation motor. Consequently, the filter can be vertically vibrated at a predetermined frequency and intervals of time according to the rotational speed of the rotation body (the rotational speed of the rotation motor). Therefore, the state of removing the moisture content that adheres to the filter could be controlled easily.

Moreover, the filter device of the invention is characterized in that, the driving side magnet comprises:

a magnet which is formed at a part in the rotating direction of a rotating body that is connected to a rotation motor and which is repulsed against the filter side magnet, and a magnet which is formed at a part in the rotating direction of the rotating body that is connected to the rotation motor and which is adsorbed with the filter side magnet mutually.

By composing like this, a plurality of the driving side magnets are composed of magnets in which the magnetic pole at the side faced to the filter side magnet is disposed in the state that it continues as differing mutually in the rotating direction of rotating body that is connected to the rotation motor or in the state that it is separated at constant intervals.

As a result, at the position that becomes the same magnetic pole in which the driving side magnet on the side of the rotation motor and is faced to the magnet on the side of the filter and adsorbed each other, the repulsion power is canceled. As a result, the filter moves to the lower side immediately not by its own weight but by the adsorptive power. Therefore, the filter can be vibrated vertically more efficiently so that the moisture which is adhered to the filter is flicked out vertically by the vertical vibration of the filter so that the moisture can be more effectively removed.

Moreover, the filter device of the invention is characterized in that a purge valve is integrally disposed at the filter side of the fluid discharge path.

Thus, the purge valve is integrally disposed at the filter side of the fluid discharge path so that the piping connected to the purge valve and the housing of the purge valve can be omitted and compact can be attained.

Moreover, the filter device of the invention is characterized in that the filter is of a disk shape or a cylindrical shape.

Thus, even if the filter is of a disk shape or a cylindrical shape, blockage by freezing of the filter can surely be prevented.

Moreover, in accordance with the area of the filter to be secured in the design and the installed space, a shape can be decided so that the flexibility in the design is improved.

Advantageous Effects of Invention

According to the invention, the filter is rotated by the rotating driving mechanism so that the moisture content that adheres to the filter is flicked out by the centrifugal force and the moisture content can be removed.

Thus, thereafter, even if the filter device is left under the low temperature, since the moisture content that becomes the origin of ice does not exist, clogging with ice is not caused. Moreover, by the vibration of the filter, impurities such as the dust that adhere to the filter are flicked out at the same time by the centrifugal force so that the impurities can be removed.

As a result, water does not adhere to and does not remain in the filter, and when leaving the system under the low temperature after the system stops, blockage by freezing the filter can surely be prevented. Moreover, as conventional, complex control is unnecessary and the heat source such as a heater for defrost is also unnecessary. As a result, a cheap and compact filter device which is disposed in the moist fluid passage of the fuel cell system can be provided.

BRIEF DESCRIPTION OF DRAWINGS

FIG. 27 is a schematic view of a conventional fuel cell system.

DESCRIPTION OF EMBODIMENTS

Hereafter, embodiments of the invention (embodiment) are described more in detail on the basis of the drawings.
Embodiment
[Embodiment 1]

Figure 1:
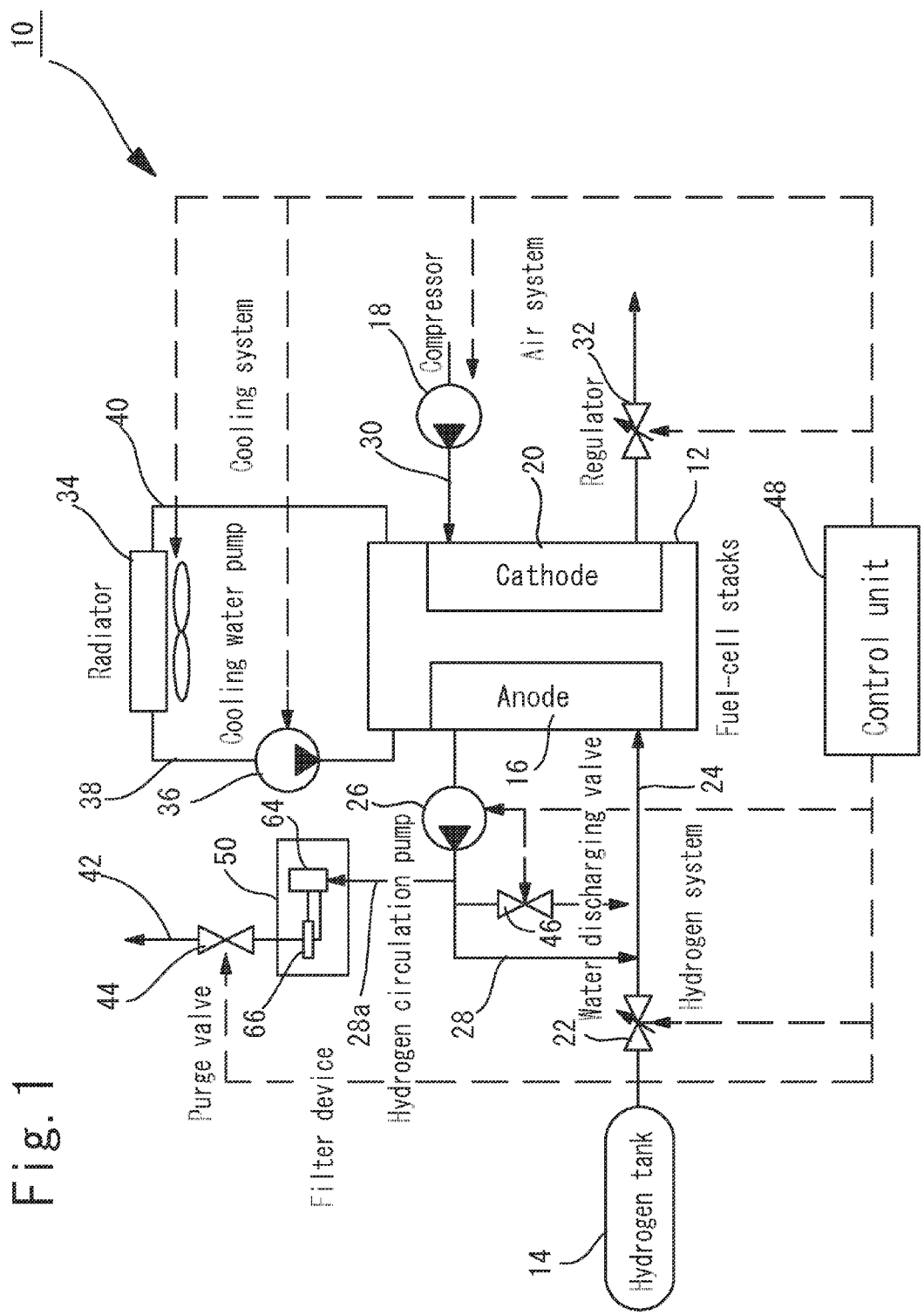
FIG. 1 is a schematic view of the fuel cell system to which the filter device of the invention is applied.
Figure 2:
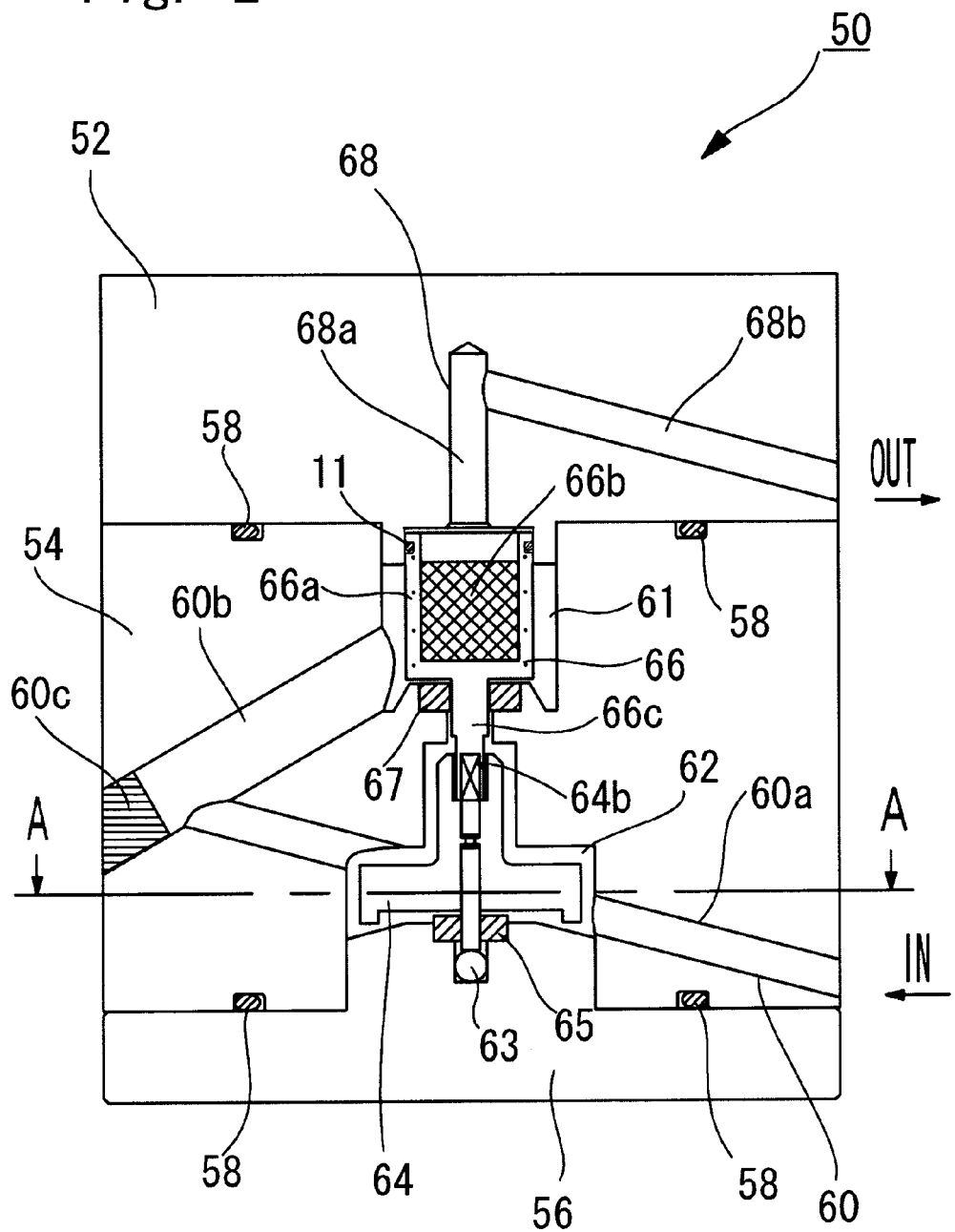
FIG. 2 is a schematic longitudinal sectional view of an embodiment of the filter device of the invention.
Figure 3:
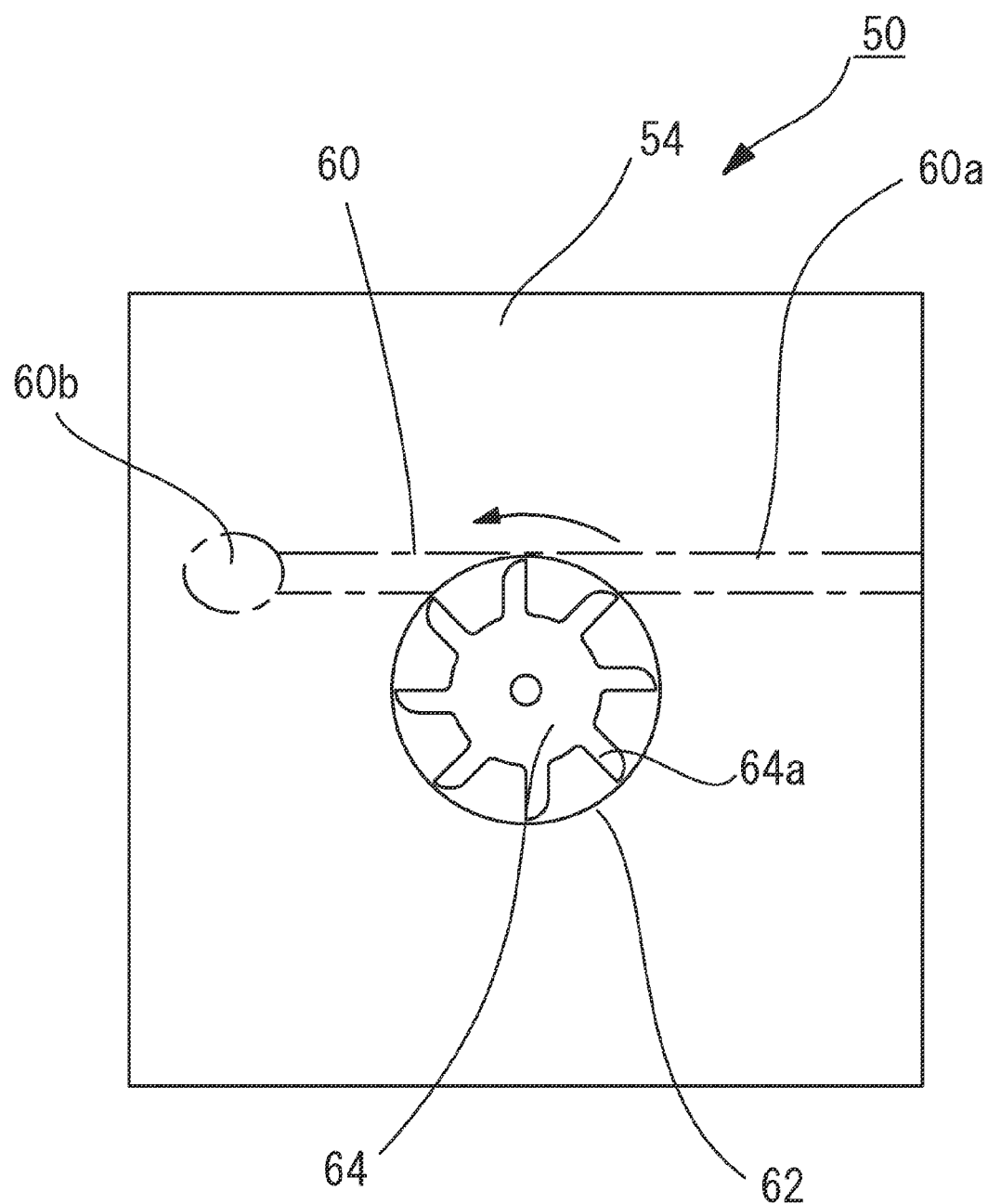
FIG. 3 is a schematic cross-sectional view in the A-A line of the filter device of FIG. 2.

FIG. 1 is a schematic view of the fuel cell system to which the filter device of the invention is applied, and FIG. 2 is a schematic longitudinal sectional view of the embodiment of the filter device of the invention, and FIG. 3 is a schematic cross-sectional view in the A-A line of the filter device of FIG. 2.

Reference numeral 10 indicates the fuel cell system to which the filter device of the invention is applied as a whole in FIG. 1.

As shown in FIG. 1, a fuel cell system 10 includes a fuel cell stack 12 that is the main body of the solid polymer type fuel cell.

In this fuel cell stack 12, an anode 16 (hydrogen pole), to which the hydrogen gas that is the fuel gas is supplied from a hydrogen tank 14 that is the fuel gas supply source, is provided. Moreover, in the fuel cell stack 12, a cathode 20 (air pole), to which air that is the oxidant gas is supplied through a compressor 18, is provided.

The hydrogen gas that is the fuel gas, is reserved in the hydrogen tank 14 as a high-pressure hydrogen gas. The high-pressure hydrogen gas supplied from the hydrogen tank 14 is decompressed to the driving pressure of the fuel cell with a hydrogen pressure adjustment valve 22 and is supplied to the anode 16 through an hydrogen supply passage 24.

The surplus hydrogen gas, which is not consumed by anode 16, is returned to the hydrogen supply passage 24 by a hydrogen circulation passage 28 through a hydrogen circulation pump 26. As a result, the surplus hydrogen gas is mixed with the hydrogen gas supplied from the hydrogen tank 14 and is supplied to the anode 16.

On the other hand, air as the oxidant gas is compressed through the compressor 18 through the air filter not shown in the figure and the compressed air is supplied to the cathode 20 through an air supply passage 30.

In addition, oxygen in the air is used to react by the cathode 20, and the remaining air is exhausted through an air pressure adjustment valve 32 that adjusts the air pressure.

Moreover, in the fuel cell stack 12, a cooling system that circulates around the cooling fluid such as cooling water is provided in order to keep the temperature of the fuel cell stack 12 at the predetermined temperature. That is, cooling fluid cooled down with a radiator 34 is circulated to cool the fuel cell stack 12 through cooling fluid circulation paths 38 and 40 by a cooling water pump 36.

Moreover, in the hydrogen circulation passage 28, a discharge path 42 to exhaust the surplus hydrogen gas outside is diverged. Moreover, for instance, a purge valve 44 with an electromagnetic valve for opening and shutting this discharge path 42 is disposed.

And, since impurities such as foreign matters may be contained in the fluid that flows in the hydrogen circulation passage 28, a filter device 50 of the invention is disposed at the upstream side of the purge valve 44 in the discharge path 42.

In the figure, reference numeral 46 indicates a water discharging valve and reference numeral 48 indicates a control unit.

The filter device 50 of the invention, as shown in FIGS. 2-3, includes an upper housing 52, a middle housing 54 and a lower housing 56. A sealing member 58 seals between the upper housing 52 and the middle housing 54 and between the middle housing 54 and the lower housing 56.

In the middle housing 54, as shown in FIG. 2 and FIG. 3, a fluid introducing path 60, which is connected to the divergence path 28a of the hydrogen circulation passage 28 and through which the fluid is introduced, is formed.

This fluid introducing path 60 comprises: first fluid introducing path 60a which is formed toward the side vicinity on the other side by upwardly inclining from lower side of the middle housing 54, and second fluid introducing path 60b, which is curved in the side vicinity on the opposite side of the middle housing 54 and is inclined upwardly.

Moreover, the outside of the juncture of the first fluid introducing path 60a and the second fluid introducing path 60b are sealed with a sealing material 60c.

As shown in FIG. 2 and FIG. 3, a part of the first fluid introducing path 60a is formed so as to pass through a part of a rotation mechanism accommodating portion 62 that is formed at a lower central portion of the middle housing 54. In this rotation mechanism accommodating portion 62, a blade member 64, which composes the rotation mechanism as vibrating means, is accommodated rotatably by a bearing 65 and a ball 63.

A plurality of blades 64a are formed in this blade member 64. As a result, with the fluid, which is introduced into the first fluid introducing path 60a from the divergence path 28 of the hydrogen circulation passage 28a, the blade member 64 is rotated in the direction indicated by the arrow of FIG. 3.

Figure 4:
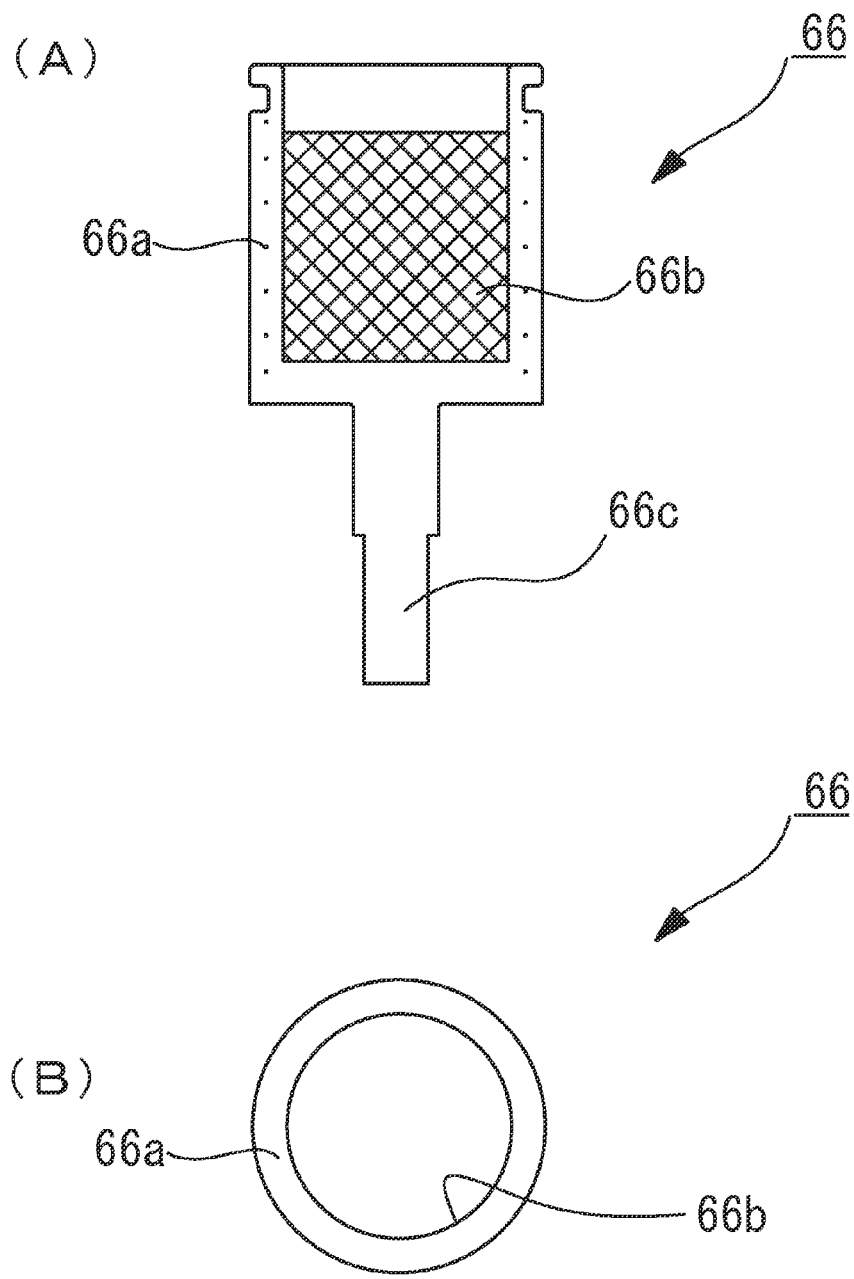
FIG. 4(A) is a schematic longitudinal sectional view of the filter portion of the filter device of FIG. 2
FIG. 4(B) is an upper view of FIG. 4(A).

On the other hand, an upper end of this second fluid introducing path 60b is communicated with a filter chamber 61 which is formed on the center of the upper part of the middle housing 54. As shown in FIG. 2 and FIG. 4, in this filter chamber 61, a filter 66 to penetrate the fluid introduced from the fluid introducing path 60 and remove, for instance, the foreign matter of garbage etc. in the fluid is removed, is accommodated rotatably by a bearing 67.

As shown in FIGS. 4(A) and (B), the filter 66 includes: a filter portion 66a having a substantial cylinder shape, a filter member 66b, such as the meshes, installed at a side periphery of this filter portion 66a, and a shank 66c which is formed under the filter portion 66a.

In addition, the sealing member 11 is disposed between the filter portion 66a and the upper housing 52.

The shank 66c of this filter 66 is fit into a shank hole 64b which is formed at the center of the upper portion of the blade member 64. As a result, as stated above, with the fluid, which is introduced into the first fluid introducing path 60a from the divergence path 28 of the hydrogen circulation passage 28a, the blade member 64 is rotated so that the filter 66 is rotated.

Moreover, on the upper part of filter 66, a fluid discharge path 68 which exhausts the fluid passed through the filter 66, is formed in the upper housing 52. This fluid discharge path 68 is connected with the purge valve 44 of the discharge path 42. Moreover, this fluid discharge path 68 comprises: first fluid discharge path 68a that extends upwardly, and second fluid discharge path 68b which is formed to the side of the upper housing 52 by inclining downwardly.

In the filter device 50 of the invention composed like this, with the fluid, which is introduced into the first fluid introducing path 60a from the divergence path 28 of the hydrogen circulation passage 28a, the blade member 64 is rotated so that the filter 66 is rotated.

As a result, by the centrifugal force (rotation vibration) due to the rotation of the filter 66, the moisture content that adheres to the filter 66 (the filter member 66b) is flicked out and removed by the centrifugal force.

Thus, thereafter, even if the filter device is left under the low temperature, since the moisture content that becomes the origin of ice does not exist, clogging with ice is not caused. Moreover, by the rotation of the filter 66, impurities such as the dust that adhere to the filter 66 are flicked out at the same time by the centrifugal force so that the impurities can be removed.

As a result, water does not adhere to and does not remain in the filter 66, and when leaving the system under the low temperature after the system stops, blockage by freezing the filter 66 can surely be prevented when the fuel cell system 10 starts. Moreover, complex control and the heat source such as a heater for defrost is also unnecessary as conventional. As a result, a cheap and compact filter device 50 which is disposed in the moist fluid passage of the fuel cell system can be provided.

Moreover, the blade member 64 is rotated with the fluid introduced into fluid introducing path 60. As a result, since the filter 66 connected with this blade member 64 rotates, other piping and power supplies are unnecessary. Therefore, a cheap and compact filter device can be provided.

In addition, the inclination is provided such as the fluid introducing path 60 and the second fluid discharge path 68b so that moisture content can be flown to a lower side of piping. In this case, on the filter 66, the upper housing 52, the middle housing 54, the lower housing 56, the fluid introducing path 60, and the fluid discharge path 68, for instance, a water-repellent treating such as the fluorine treating etc. is applied. Consequently, it is desirable since moisture becomes easy to flow.

In this case, as for a material of the filter portion 66a of the filter 66 and of the filter member 66b, there is no particular limitation. The filter can be formed of well-known, various materials if the materials possess a filter function.

[Embodiment 2]

Figure 5:
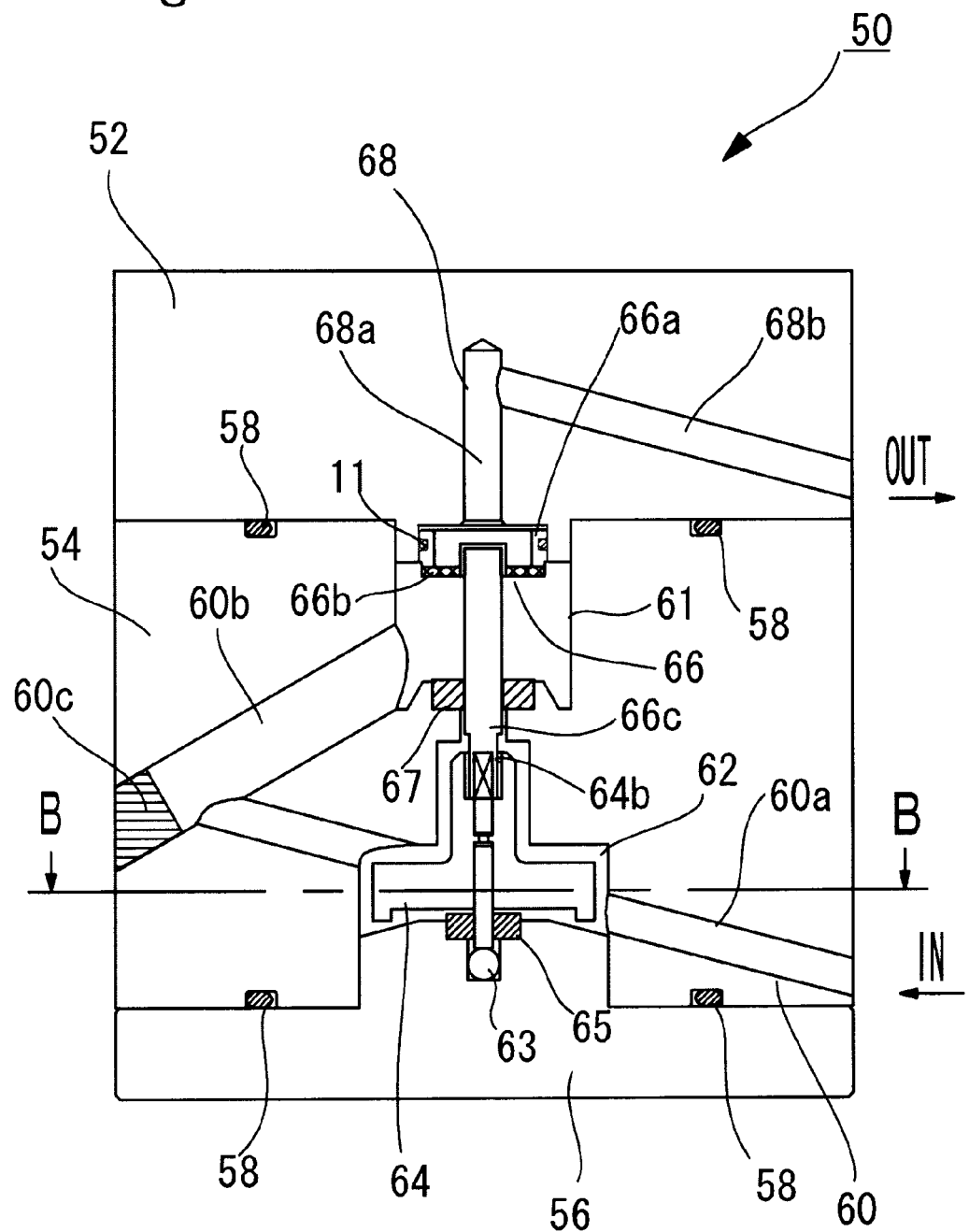
FIG. 5 is a schematic longitudinal sectional view of another embodiment of the filter device of the invention.
Figure 6:
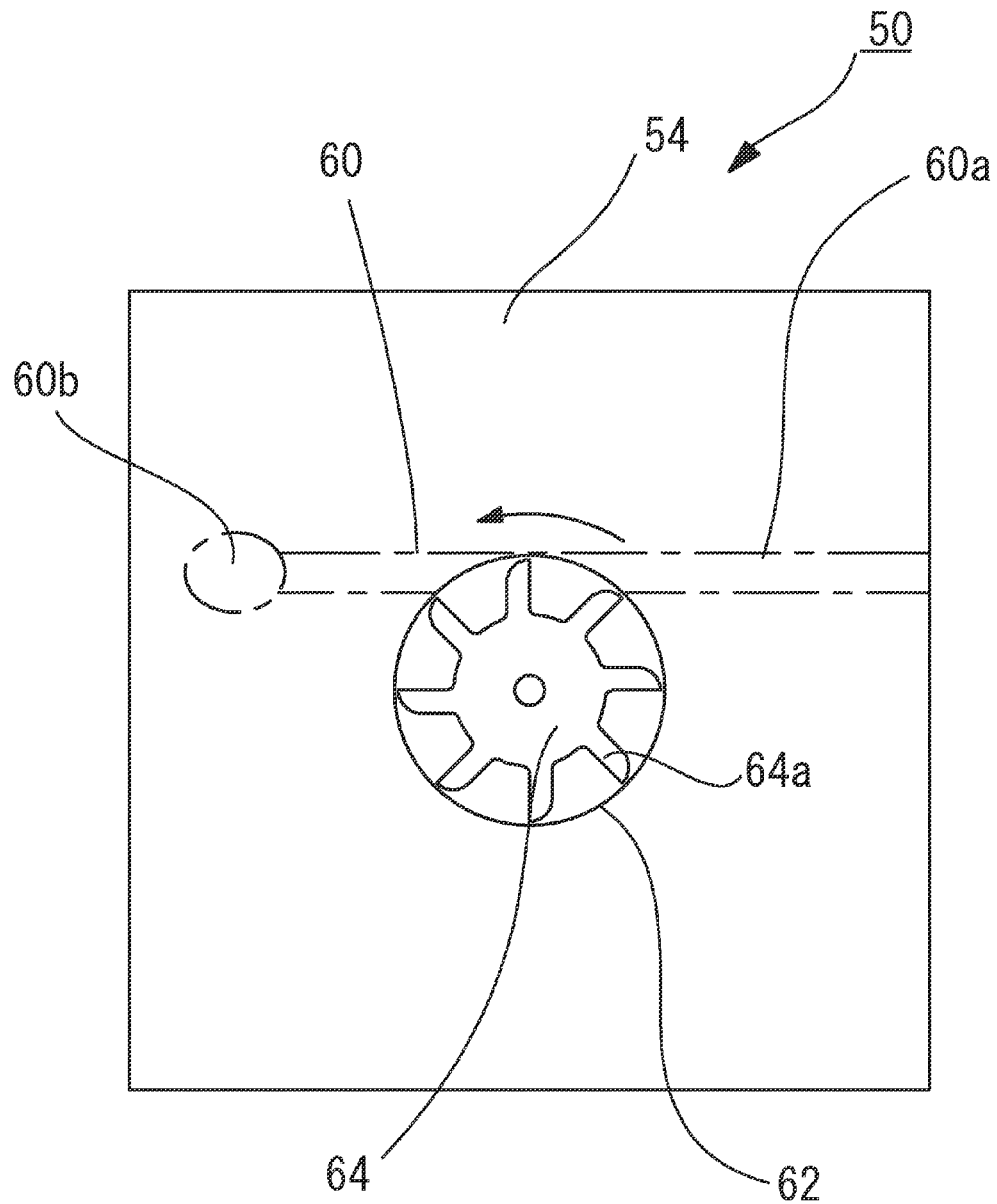
FIG. 6 is a schematic cross-sectional view in the B-B line of the filter device of FIG. 5.

FIG. 5 is a schematic longitudinal sectional view of another embodiment of the filter device of the invention. FIG. 6 is a schematic cross-sectional view in the B-B line of the filter device of FIG. 5. FIG. 7(A) is a schematic longitudinal sectional view of the filter portion of the filter device of FIG. 5, and FIG. 7(B) is an upper view of FIG. 7(A).

The filter device 50 of this embodiment is a composition basically similar to the filter device 50 of embodiment 1 shown in FIG. 1-FIG. 4. Like reference numerals refer to the same composition members, and the detailed explanation is omitted.

Figure 7:
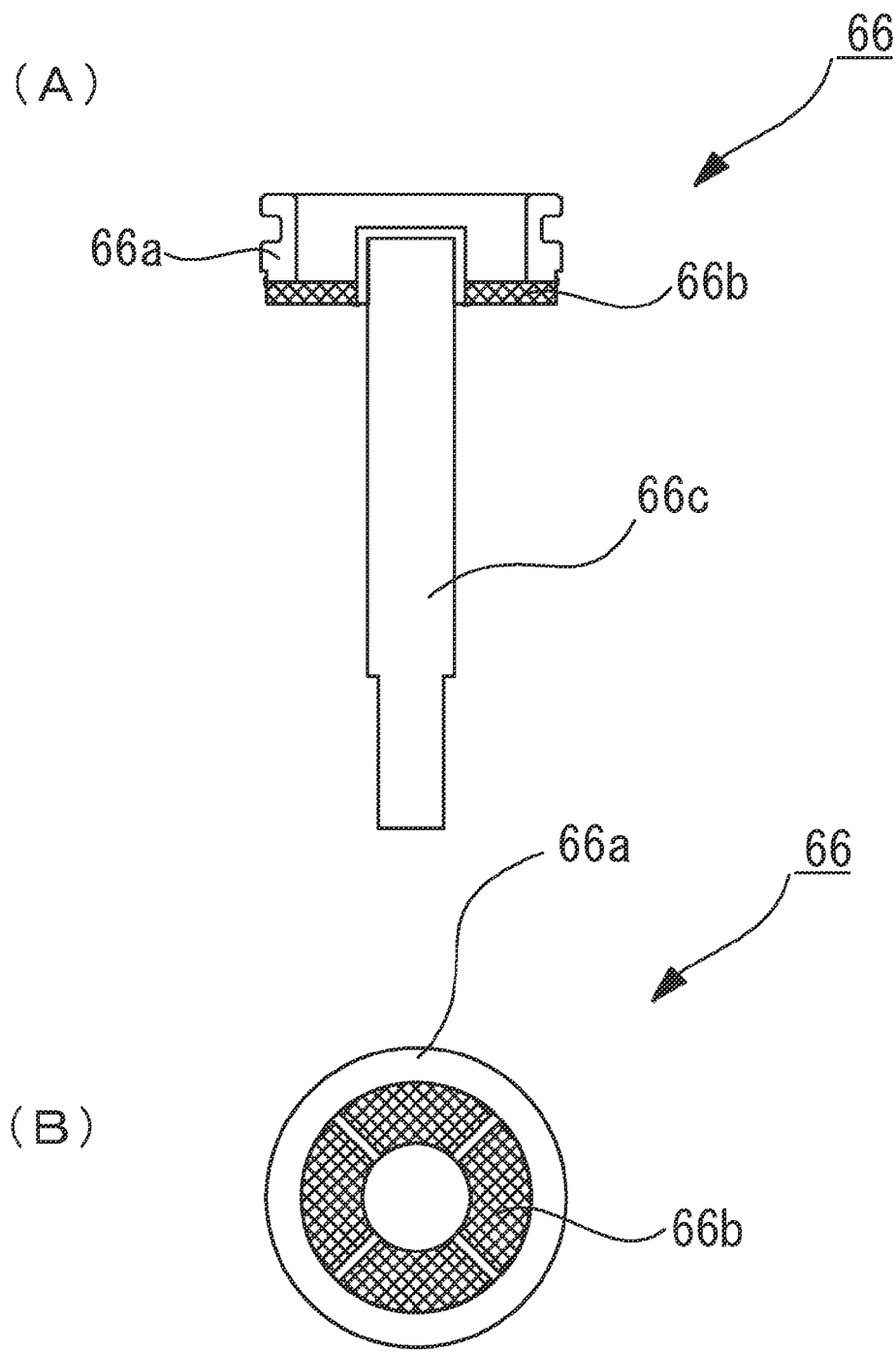
FIG. 7(A) is a schematic longitudinal sectional view of the filter portion of the filter device of FIG. 5
FIG. 7(B) is an upper view of FIG. 7(A).

In the filter device 50 of this embodiment, the filter 66 is of a substantially disk shape as shown in FIG. 5 and FIG. 7. Moreover, on the filter 66, as shown in FIGS. 7(A) and (B), the filter member 66b, such as the meshes, which is disposed under the filter portion 66a is formed.

Thus, the filter 66 is of a substantially disk shape so that in accordance with the area of the filter to be secured in the design and the installed space, a shape can be decided so that the flexibility in the design is improved.

[Embodiment 3]

Figure 8:
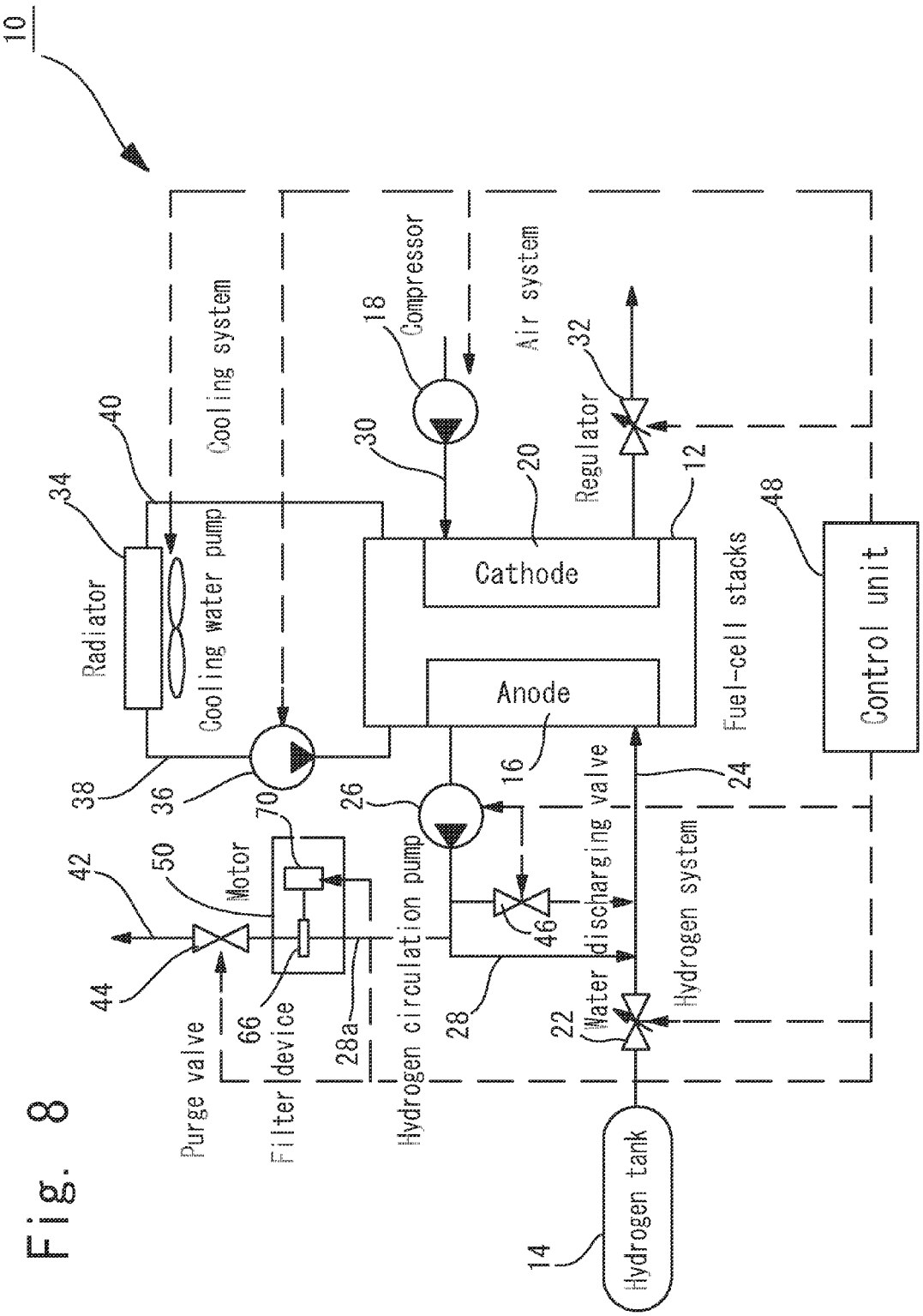
FIG. 8 is a schematic view of the fuel cell system to which the filter device of another embodiment of the invention is applied.
Figure 9:
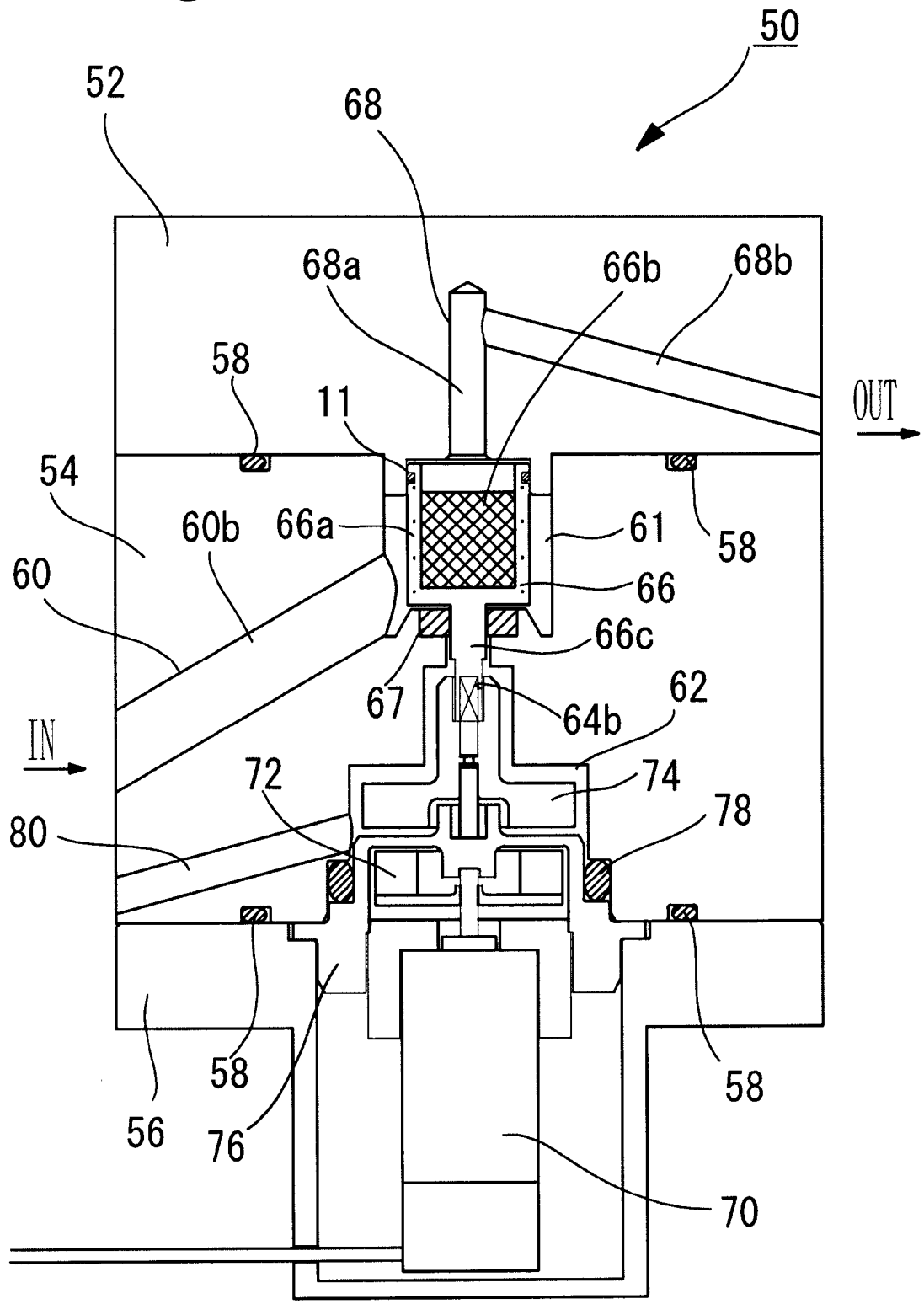
FIG. 9 is a schematic longitudinal sectional view of another embodiment of the filter device of the invention.

FIG. 8 is a schematic view of the fuel cell system to which the filter device of another embodiment of the invention is applied. FIG. 9 is a schematic longitudinal sectional view of another embodiment of the filter device of the invention.

The filter device 50 of this embodiment is a composition basically similar to the filter device 50 of embodiment 1 shown in FIG. 1-FIG. 4. Like reference numerals refer to the same composition members, and the detailed explanation is omitted.

In the filter device 50 of this embodiment, as shown in FIG. 9, in the rotation mechanism accommodating portion 62, instead of the blade member 64 of the filter device 50 of the embodiment shown in FIG. 1-FIG. 4, a rotation motor 70 is disposed as a rotating driving mechanism that is the vibrating means.

Furthermore, a rotation magnet 72 for drive is connected with a driving shaft side of the rotation motor. As a vibrating means, with magnet coupling of the rotation magnet 72 for drive and a magnet 74 for rotation, the filter 66 is rotated by the driving rotation motor 70.

In addition, between the rotation magnet 72 for drive and the magnet 74 for rotation, a partition member 76 to airtightly separate between the rotation mechanism accommodating portion 62 is disposed. In addition, reference numeral 78 indicates the sealing member in the figure.

By composing like this, without providing a complex sealing structure, a complete sealing structure can be formed against hydrogen which has a small size of the molecule and is easy to leak out. In the motor drive portion, deterioration by the hydrogen brittleness, which is caused by contacting hydrogen with a metallic member, can be prevented.

The motor does not enter the state of the lock even when the filter can not rotate with ice, etc. Consequently, damages caused by the overcurrent of the motor can be prevented.

Moreover, in the filter device 50 of this embodiment, as for the fluid introducing path 60, neither the first fluid introducing path 60a nor the sealing member 60c is disposed. The fluid introducing path 60 comprises only the second fluid introducing path 60b. Moreover, as shown in FIG. 8, this second fluid introducing path 60b is connected with the divergence path 28a of the hydrogen circulation passage 28 so that the fluid is introduced.

In addition, between magnet couplings of the rotation magnet 72 for drive and the magnet 74 for rotation, a leak fluid discharge path 80 is disposed. As a result, the leak fluid discharge path 80 is connected with the fluid introducing path 60 (the second fluid introducing path 60b). Consequently, the leak fluid is returned to the fluid introducing path 60.

By composing like this, the fluid that leaks from the rotation sliding area on the filter 66 sides can be returned to the fluid introducing path 60 again.

In the filter device 50 composed like this, when the filter 66 is desired to be rotated for the predetermined time by using the rotation motor 70, for instance, the filter 66 can be controlled to be rotated only for a fixed time on a process of the system termination. It is possible that life of the rotating driving mechanism that rotates the filter 66 is prolonged.

Moreover, either of the rotation magnet 72 for drive connected with a driving shaft side of the rotation motor 70 and the magnet 74 for rotation connected with the filter 66 can be a magnet. The other can be a magnet or formed of magnetic material.

By composing like this, the use of an expensive magnet can be selectively used so that a cheap filter device can be provided.

In this case, a neodymium magnet is known as a magnet with strong magnetism. However, since the neodymium magnet rusts easily by moisture, setting the neodymium magnet up in the passage of the hydrogen system including steam is not suitable. Therefore, it is desirable to use a ferrite magnet or magnetic material.

[Embodiment 4]

Figure 10:
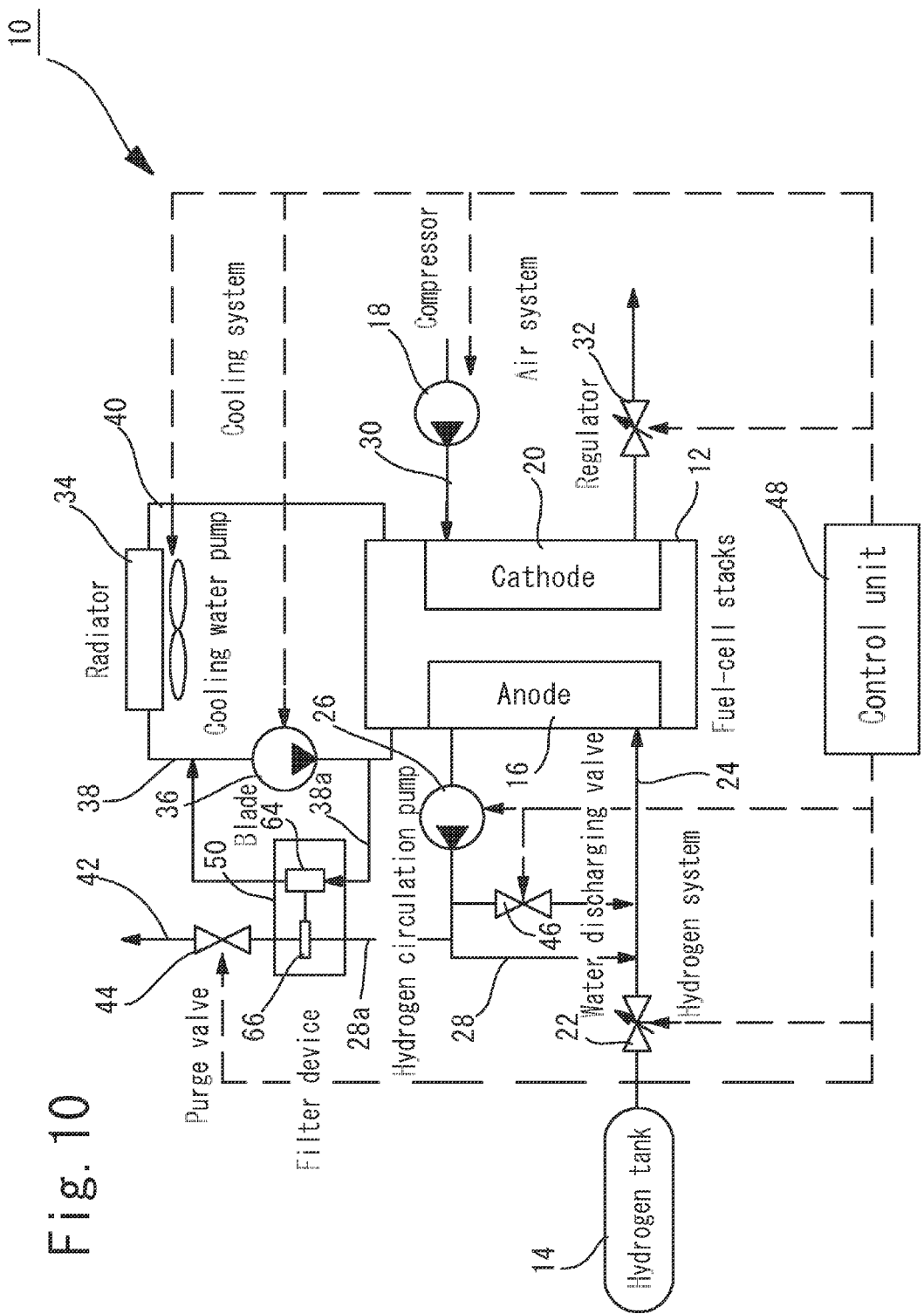
FIG. 10 is a schematic view of the fuel cell system to which the filter device of another embodiment of the invention is applied.
Figure 11:
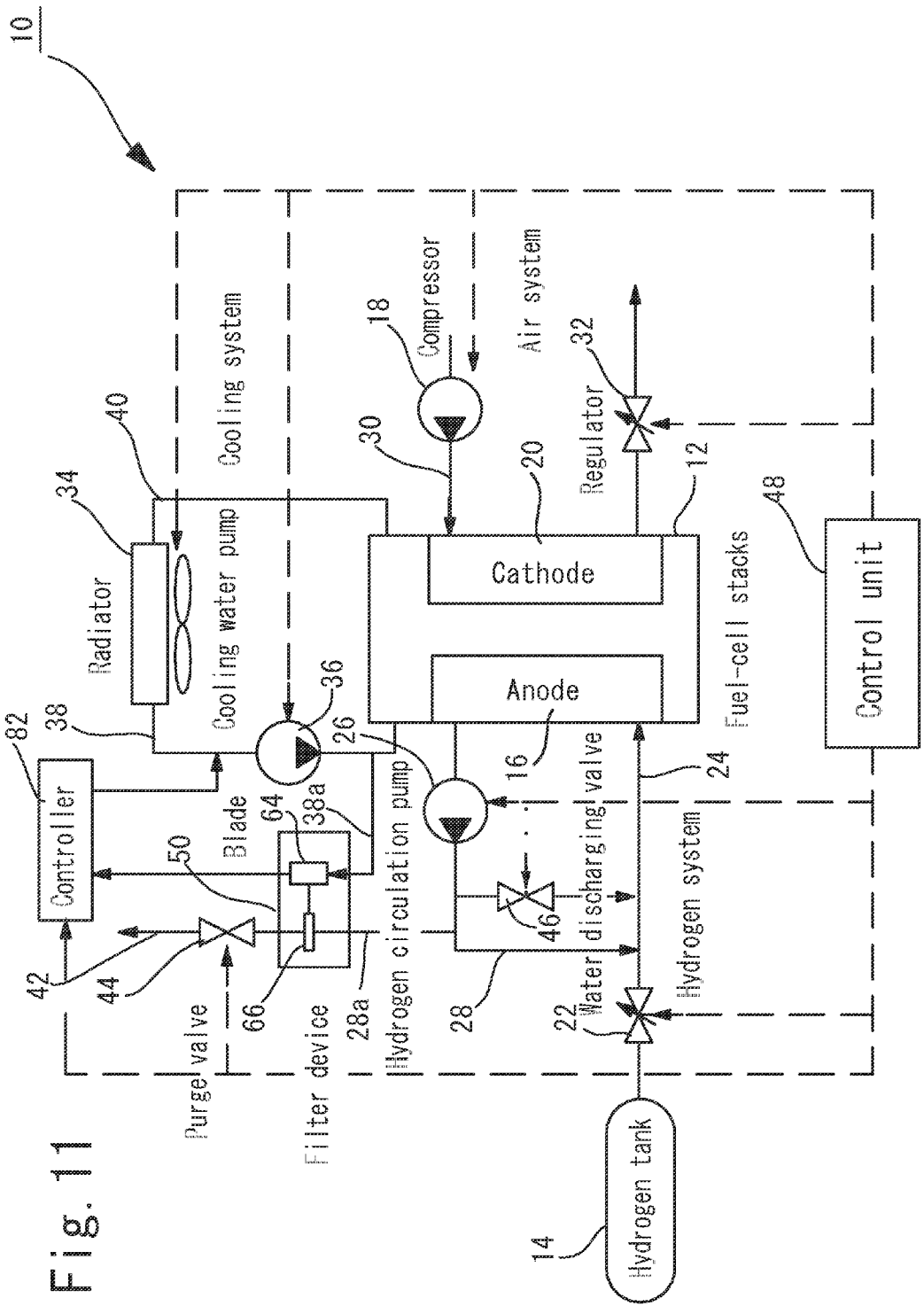
FIG. 11 is a schematic view of the fuel cell system to which the filter device of another embodiment of the invention is applied.
Figure 12:
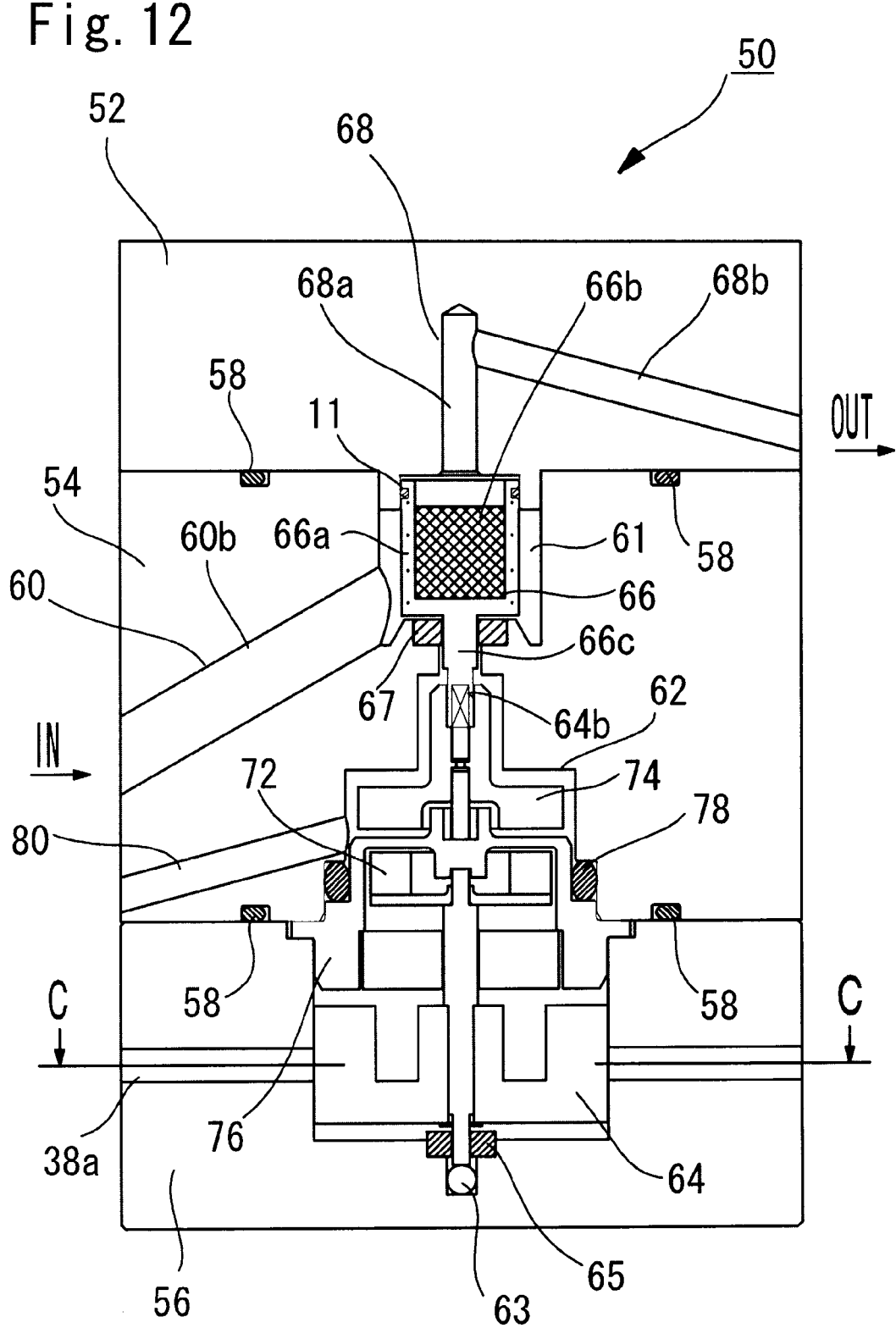
FIG. 12 is a schematic longitudinal sectional view of another embodiment of the filter device of the invention.
Figure 13:
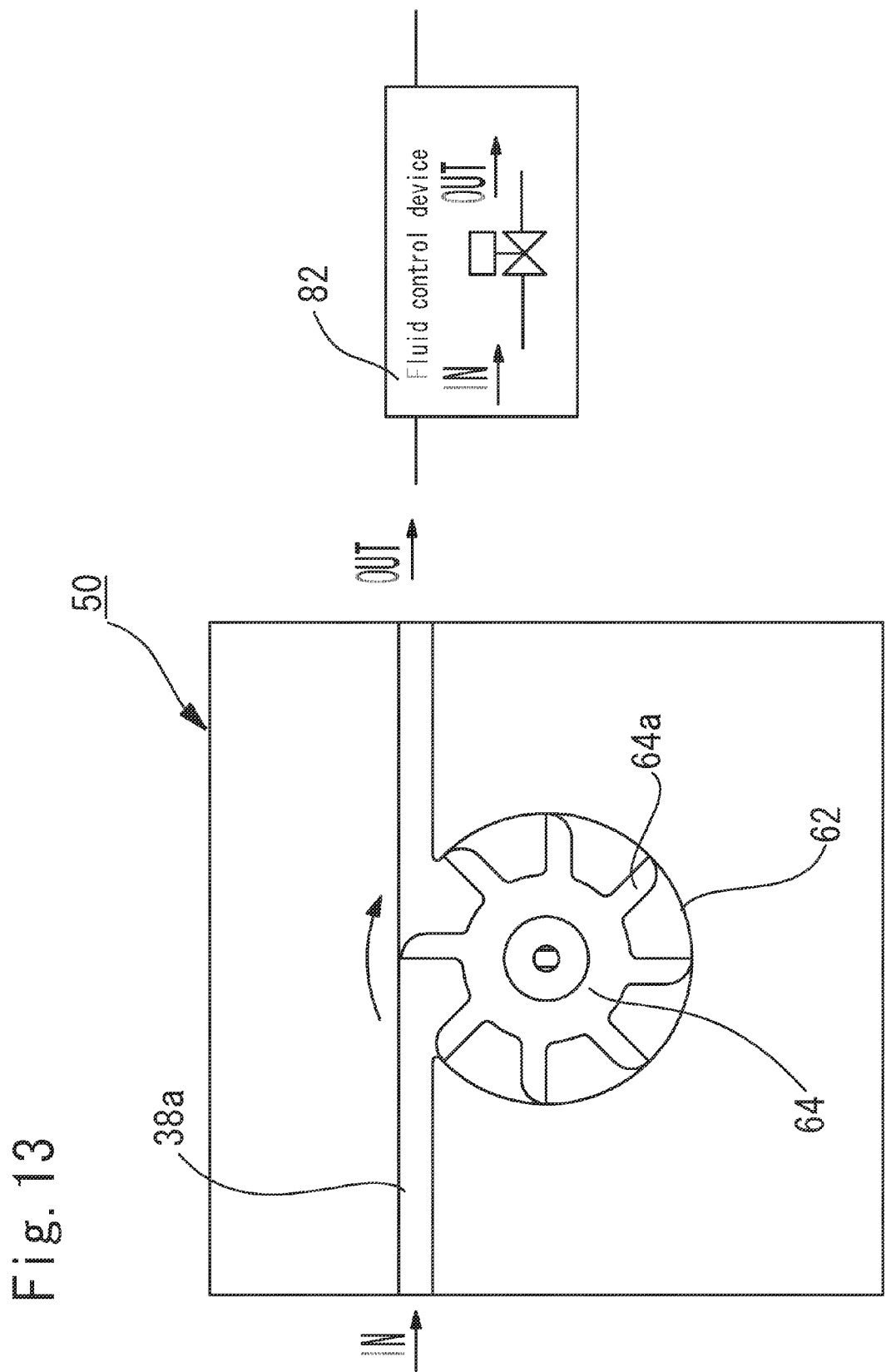
FIG. 13 is a schematic cross-sectional view in the C-C line of the filter device of FIG. 12.

FIG. 10 is a schematic view of the fuel cell system to which the filter device of another embodiment of the invention is applied. FIG. 11 is a schematic view of the fuel cell system to which the filter device of another embodiment of the invention is applied. FIG. 12 is a schematic longitudinal sectional view of another embodiment of the filter device of the invention. FIG. 13 is a schematic cross-sectional view in the C-C line of the filter device of FIG. 12.

The filter device 50 of this embodiment is a composition basically similar to the filter device 50 of embodiment 1 shown in FIG. 1-FIG. 4 and the filter device 50 of embodiment 3 shown in FIG. 8-FIG. 9. Like reference numerals refer to the same composition members, and the detailed explanation is omitted.

In the filter device 50 of this embodiment, as well as filter device 50 of the embodiment shown in FIG. 8-FIG. 9, as for the fluid introducing path 60, neither the first fluid introducing path 60a nor the sealing member 60c are installed. The fluid introducing path 60 is composed only of the second fluid introducing path 60b. In addition, as shown in FIG. 10 and FIG. 11, this second fluid introducing path 60b is connected with the divergence path 28a of the hydrogen circulation passage 28, and the fluid is introduced.

Moreover, in the filter device 50 of this embodiment, in the lower housing 56, a blade member 64, which composes the rotation mechanism as a vibrating means, is accommodated rotatably by a bearing 65 and a ball 63.

A plurality of blades 64a are formed in this blade member 64. As a result, as a fluid for the rotation drive, with the cooling fluid, which is introduced into a cooling fluid divergence path 38a diverged from the cooling fluid circulation path 38, the blade member 64 is rotated in the direction indicated by the arrow of FIG. 13. Furthermore, as shown in FIG. 10, FIG. 11, and FIG. 13, the cooling fluid introduced into this cooling fluid divergence path 38a is returned to the cooling fluid circulation path 38 again.

Moreover, in the filter device 50 of this embodiment, as well as the filter device 50 of embodiment 3 shown in FIG. 8-FIG. 9, the rotation magnet 72 for drive is connected with the side of the blade member 64 and the magnet 74 for rotation is connected with the shank 66c of the filter 66. With magnet coupling of the rotation magnet 72 for drive and magnet 74 for rotation, the filter 66 is rotated by the cooling fluid.

In addition, between rotation magnet 72 for drive and magnet 74 for rotation, the partition member 76 to airtightly separate between the rotation mechanism accommodating portions 62 is disposed.

By composing like this, the blade member 64 is rotated with the cooling fluid introduced into the cooling fluid divergence path 38a such as the radiator 34. As a result, since the filter 66 connected with this blade member 64 rotates, the cooling fluid of cooling fluid circulation path 38 can be used for rotation. Consequently, the filter 66 can be rotated without being limited to the amount of the purge of the purge valve 44, so that moisture content can be surely flicked out by the centrifugal force.

Moreover, in the filter device 50 of this embodiment, as shown in FIG. 11 and FIG. 13, by control of the fluid control device 82 that controls the introducing of cooling water and is disposed in the cooling fluid divergence path 38a, the rotation of the blade member 64 is controlled.

By composing like this, by control of the fluid control device 82 that controls introduction of cooling water (control of introducing cooling medium and stopping the introduction), when the filter 66 is desired to be rotated for the predetermined time, for instance, the filter 66 can be controlled to be rotated only for a fixed time on a process of the system termination. Therefore, life of the rotating driving mechanism that rotates the filter 66 can be prolonged.

[Embodiment 5]

Figure 14:
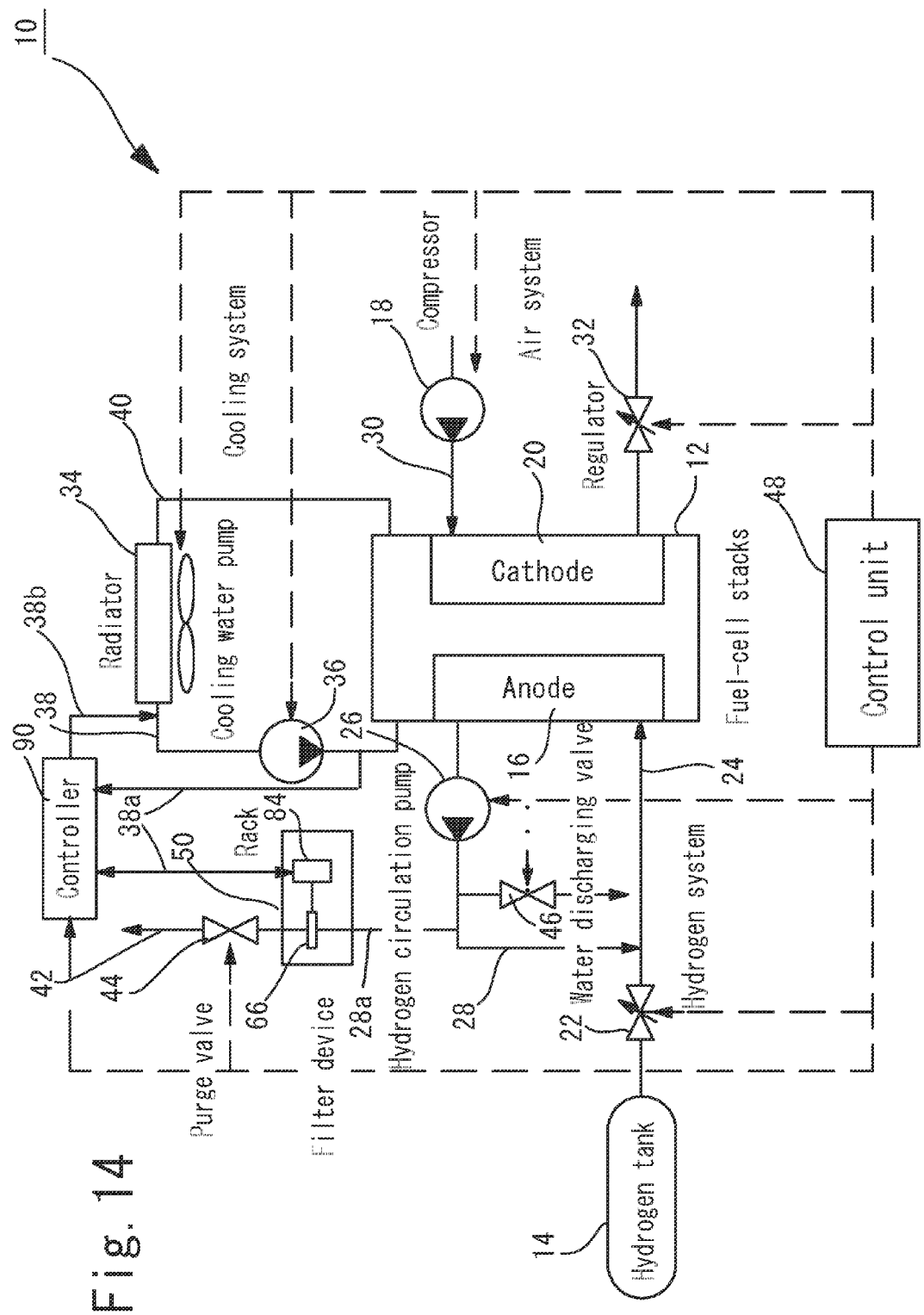
FIG. 14 is a schematic view of the fuel cell system to which the filter device of another embodiment of the invention is applied.
Figure 15:
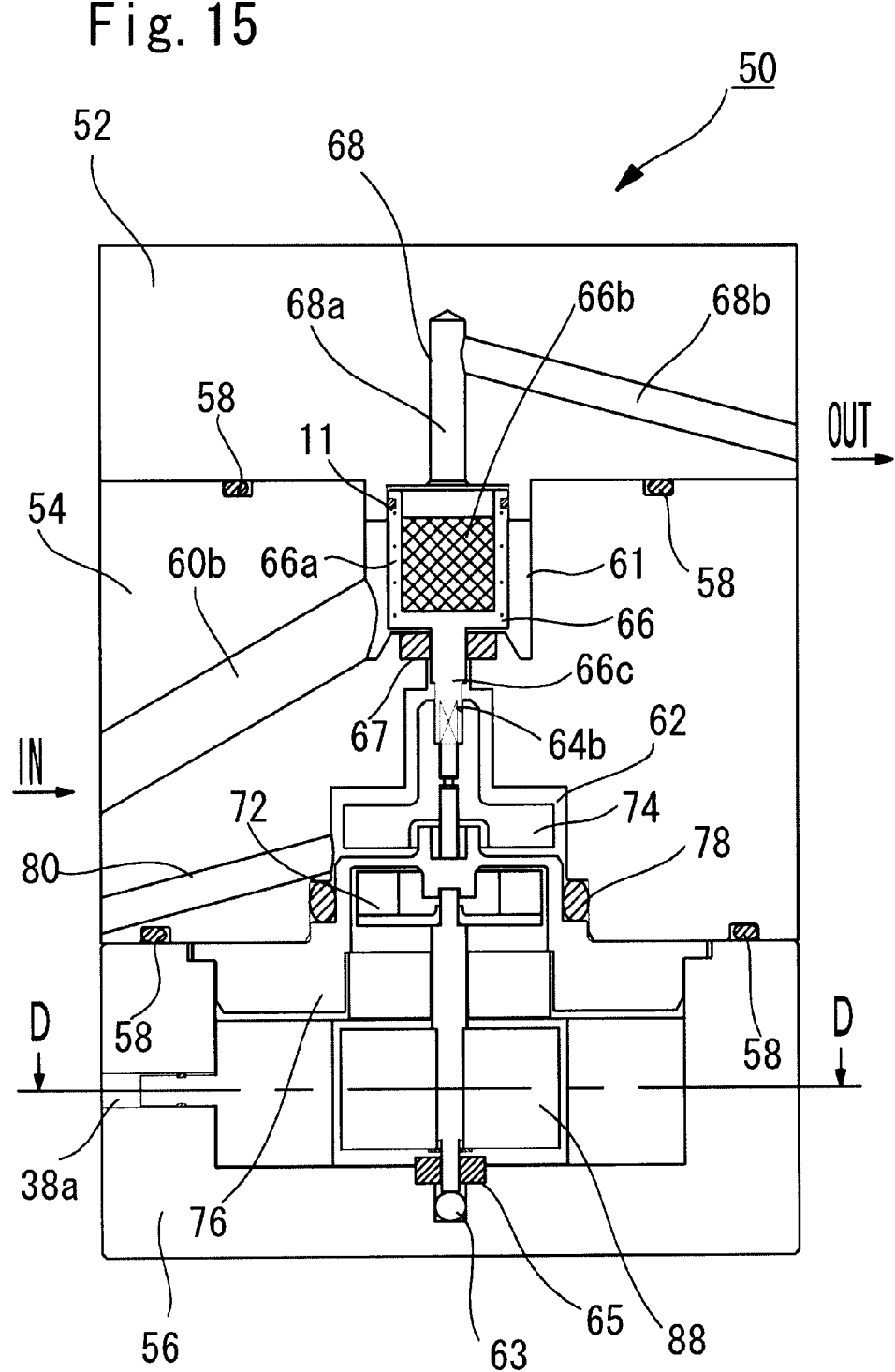
FIG. 15 is a schematic longitudinal sectional view of another embodiment of the filter device of the invention.
Figure 16:
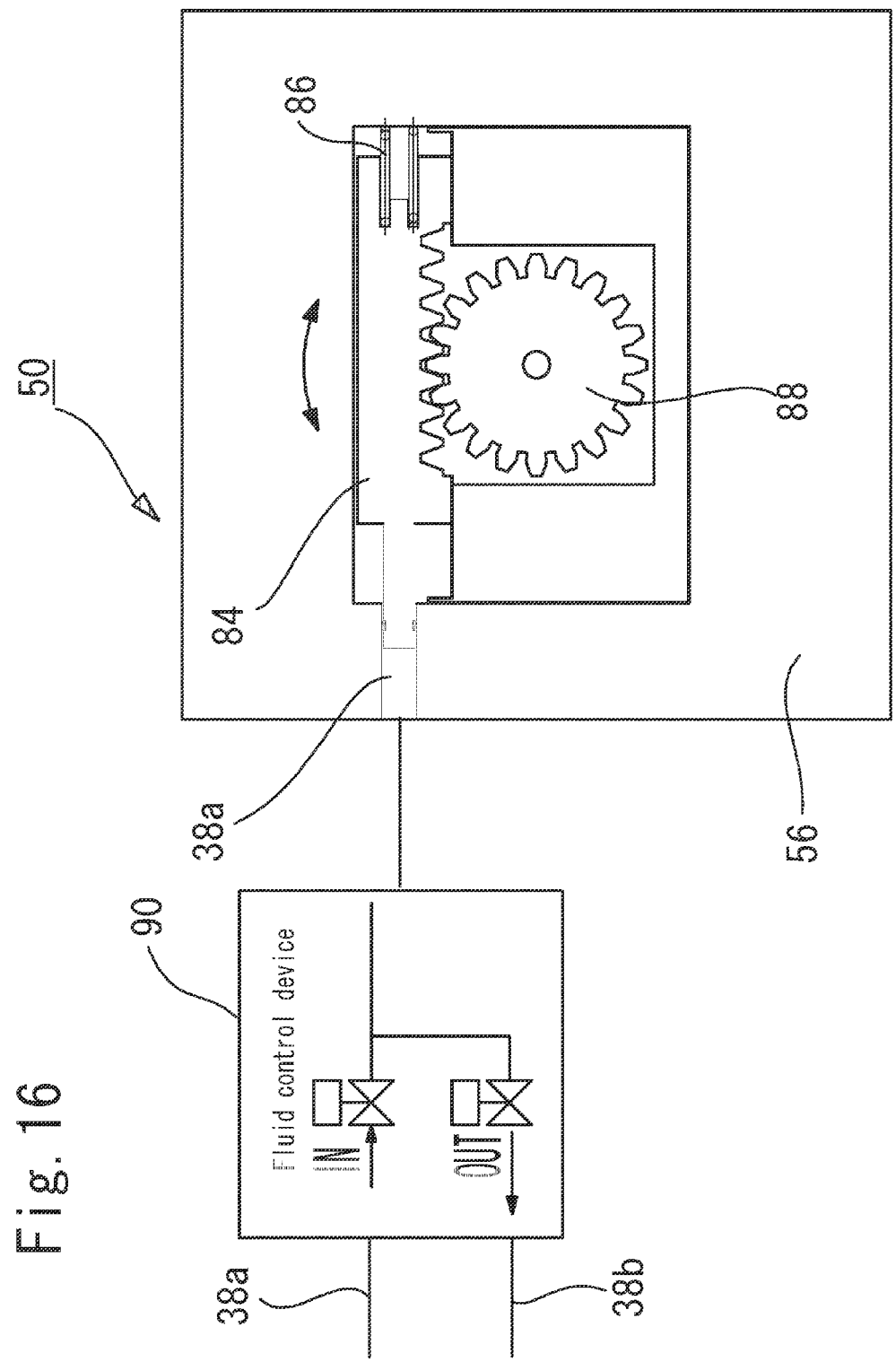
FIG. 16 is a schematic cross-sectional view in the D-D line of the filter device of FIG. 15.

FIG. 14 is a schematic view of the fuel cell system to which the filter device of another embodiment of the invention is applied. FIG. 15 is a schematic longitudinal sectional view of another embodiment of the filter device of the invention. FIG. 16 is a schematic cross-sectional view in the D-D line of the filter device of FIG. 15.

The filter device 50 of this embodiment is a composition basically similar to the filter device 50 of embodiment 4 shown in FIG. 10-FIG. 13. Like reference numerals refer to the same composition members, and the detailed explanation is omitted.

In the filter device 50 of this embodiment, in the lower housing 56, as a fluid for rotation drive, a rack member 84, which is reciprocated by the cooling fluid introduced into the cooling fluid divergence path 38a that diverges from the cooling fluid circulation path 38, is provided. In addition, the edge of the rack member 84 is urged, by spring member 86, to the left side in FIG. 16, that is, to the entrance side of the cooling fluid divergence path 38a.

Moreover, this cooling fluid divergence path 38a, as well as the filter device 50 of the embodiment shown in FIG. 10-FIG. 13, is returned to the cooling fluid circulation path 38.

In addition, a pinion member 88, which is connected to the filter 66 and is engaged with the rack member 84 and is rotated by movement of the rack member 84, is provided.

Moreover, as shown in FIG. 14 and FIG. 16, by control of a fluid control device 90 that controls introduction of cooling water and that is disposed in the cooling fluid divergence path 38*a*, the rotation of the pinion member 88 is controlled by the move of the rack member 84.

In addition, the pinion member 88 can be rotated in both directions by moving the reciprocation of the rack member 84. Moreover, the rack member 84 and the pinion member 88 are engaged only in the movement of forwards or backwards so that the pinion member 88 can be rotated in one direction.

By composing like this, by the cooling fluid introduced into the cooling fluid divergence path 38*a*, against a spring member 86, on the right side in FIG. 16, i.e. an opposite side to the entrance side of the cooling fluid divergence path 38*a*, the rack member 84 is moved. Furthermore, by stopping introduction of the cooling fluid and exhausting the cooling fluid, by the urging power of the spring member 86, to the left side in FIG. 16, i.e. to the entrance side of the cooling fluid divergence path 38*a*, the rack member 84 is moved. As a result, the pinion member 88 is rotated by moving these rack members 84.

In this embodiment like this, by the rack member 84, the pinion member 88 and the pinion member 88 that is engaged with the rack member 84 and that is rotated by the moving rack member 84, the vibrating means is composed.

As a result, since the filter 66 connected with this pinion member 88 rotates, the cooling fluid of the cooling fluid circulation path 38 can be used for rotation. Therefore, the filter 66 can be rotated without being limited to the amount of the purge of the purge valve 44 so that moisture content can be surely flicked out and be removed by the centrifugal force.

Moreover, as shown in FIG. 14 and FIG. 16, by control of the fluid control device 90 that controls introduction of cooling water (control for introducing cooling medium and stopping the introduction), the rotation of pinion member 88 is controlled by the movement of the rack member 84. As a result, when the filter 66 is desired to be rotated for the predetermined time, for instance, the filter 66 can be controlled to be rotated only for a fixed time on a process of the system termination. Therefore, life of the rotating drive mechanism that rotates the filter 66 can be prolonged.

[Embodiment 6]

Figure 17:
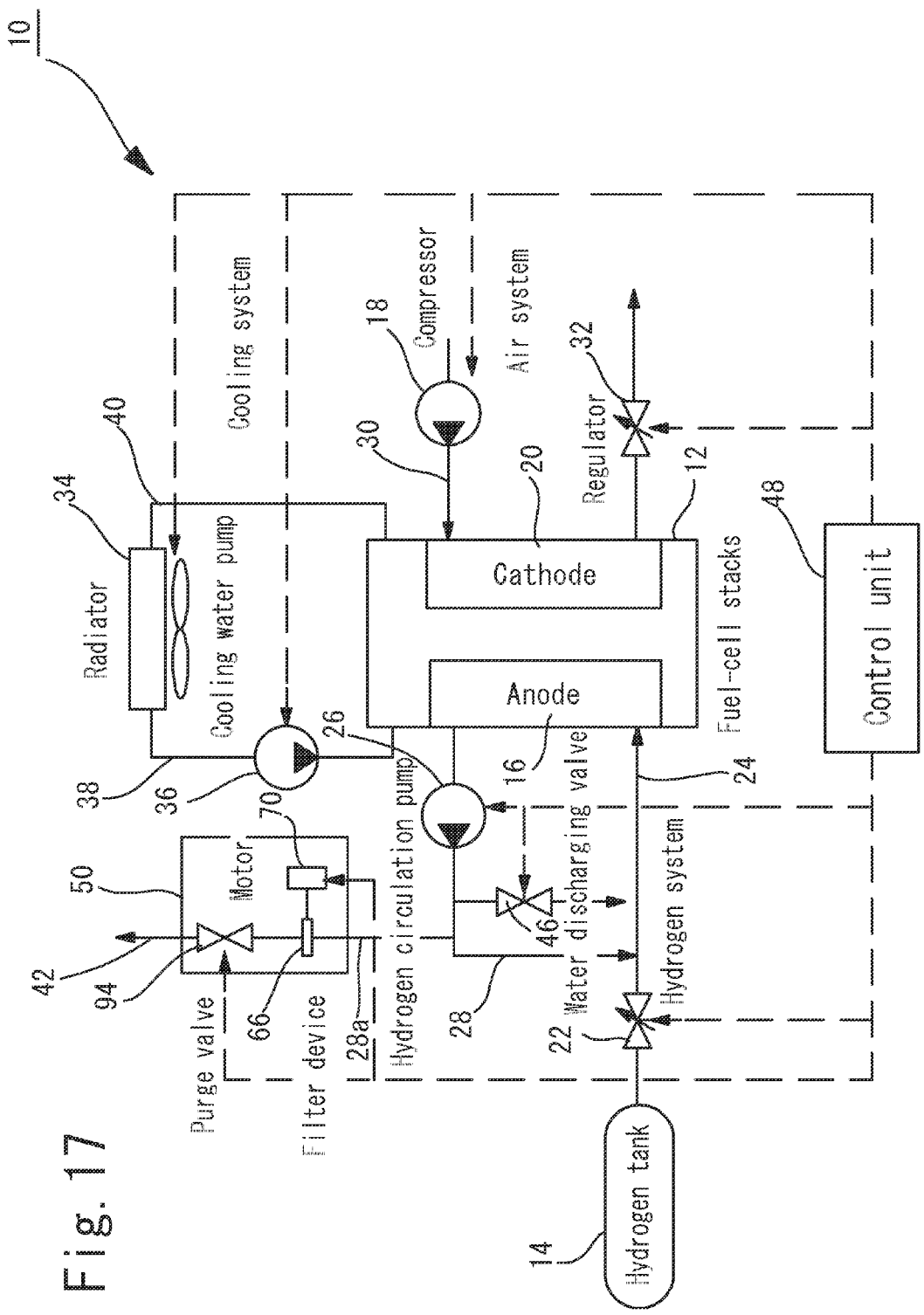
FIG. 17 is a schematic view of the fuel cell system to which the filter device of another embodiment of the invention is applied.
Figure 18:
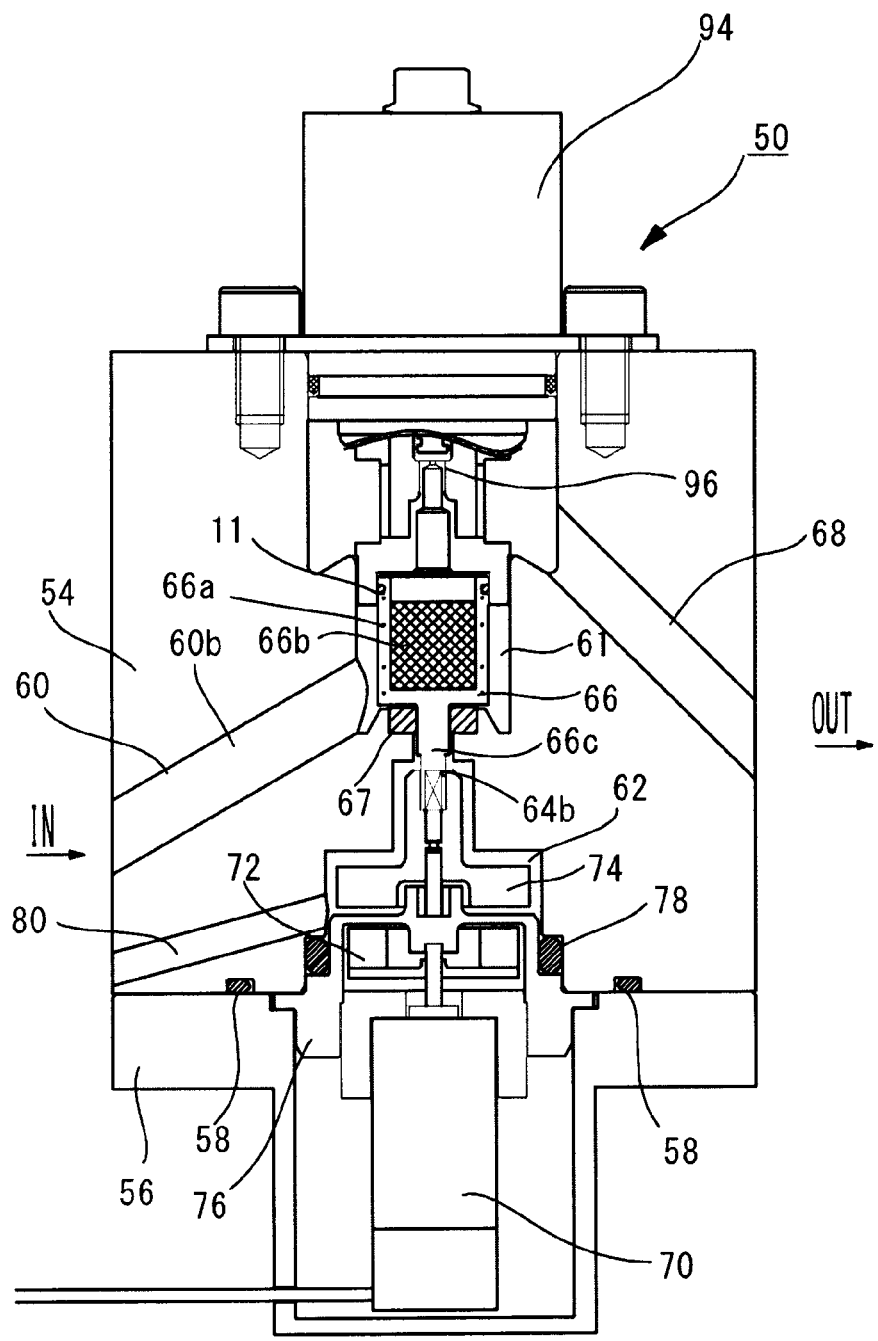
FIG. 18 is a schematic longitudinal sectional view of another embodiment of the filter device of the invention.

FIG. 17 is a schematic view of the fuel cell system to which the filter device of another embodiment of the invention is applied. FIG. 18 is a schematic longitudinal sectional view of another embodiment of the filter device of the invention.

The filter device 50 of this embodiment is a composition basically similar to the filter device 50 of the embodiment shown in FIG. 8-FIG. 9. Like reference numerals refer to the same composition members, and the detailed explanation is omitted.

In the filter device 50 of this embodiment, as shown in FIG. 17 and FIG. 18, a purge valve 94 is integrally disposed on the side of the filter 66 of the fluid discharge path 68.

Thus, to integrally dispose the purge valve 94 on the side of the filter 66 of the fluid discharge path 68, the piping connected with the purge valve 94 and the housing of the purge valve 94 can be omitted and compact can be attempted.

[Embodiment 7]

Figure 19:
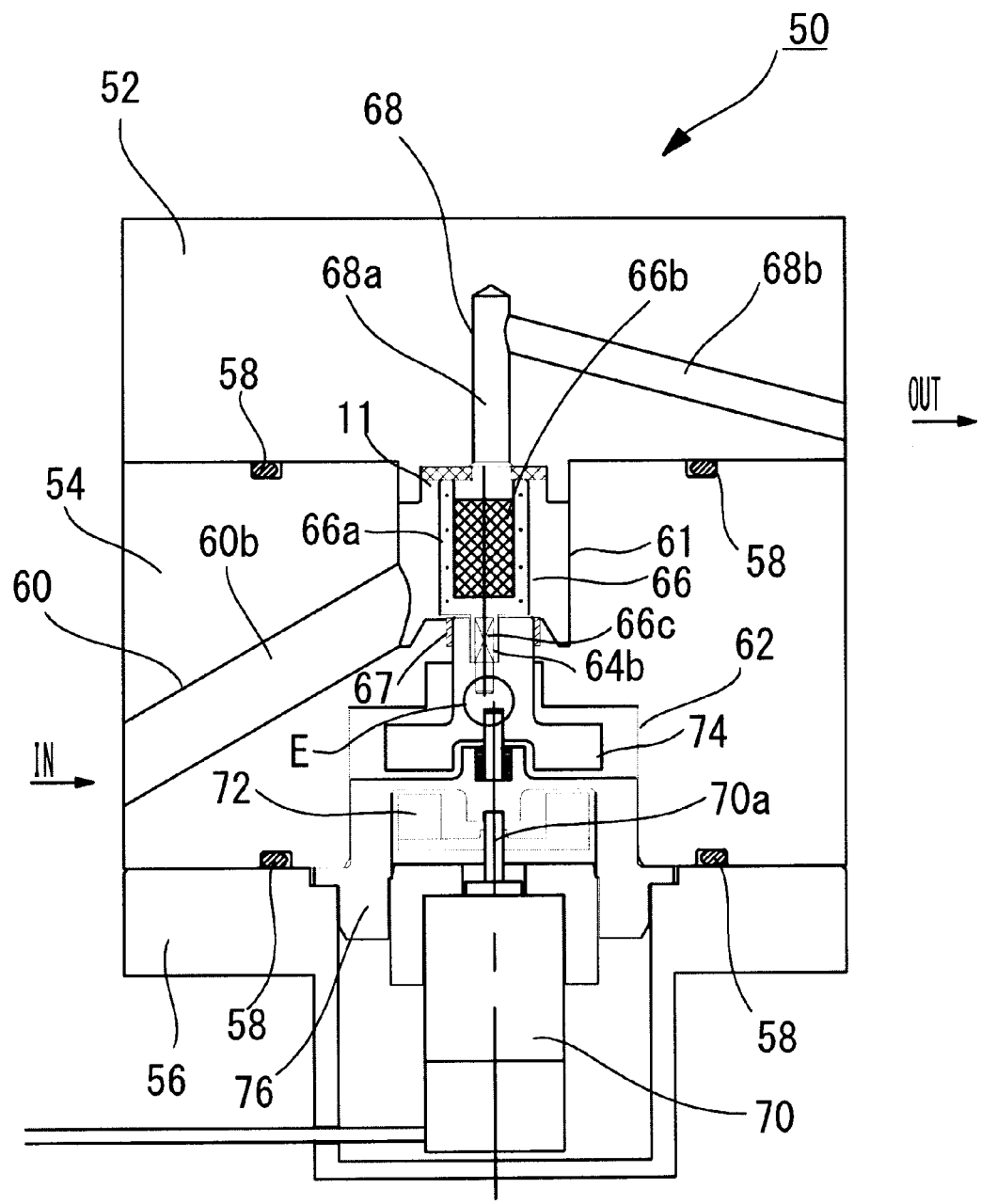
FIG. 19 is a schematic longitudinal sectional view of another embodiment of the filter device of the invention.
Figure 20:
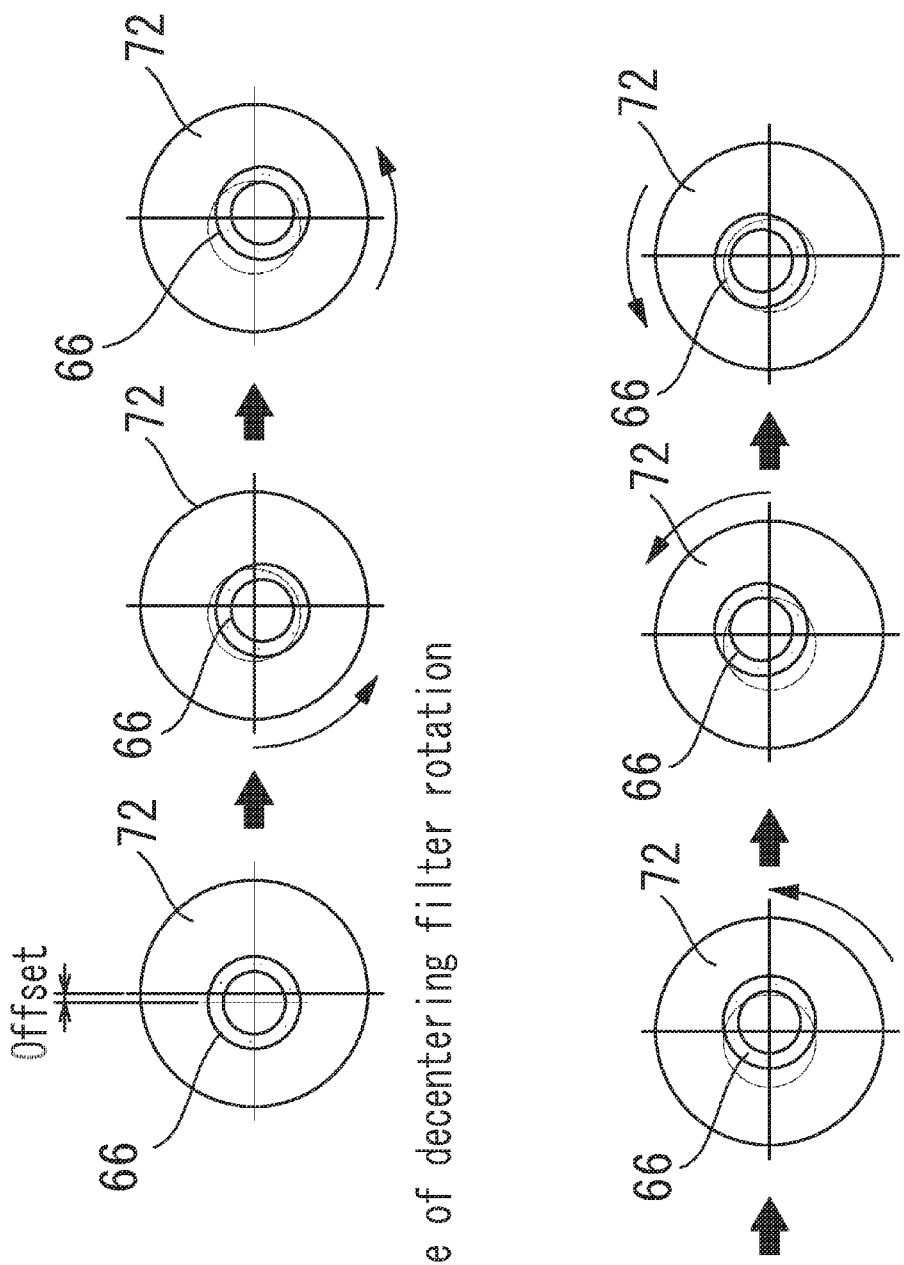
FIG. 20 is a schematic upper view explaining rotating-eccentric vibration of filter 66 by the eccentricity with driving shaft 70a of rotation motor 70 and shaft portion 66c of filter 66.

FIG. 19 is a schematic longitudinal sectional view of another embodiment of the filter device of the invention. FIG. 20 is a schematic upper view explaining rotating-eccentric vibration of filter 66 by eccentricity with drive shaft 70*a* of rotation motor 70 and shaft portion 66*c* of filter 66.

In the filter device 50 of this embodiment, as well as the filter device 50 of embodiment 3 shown in FIG. 8-FIG. 9, a composition basically similar to the embodiment to which the rotation motor 70 is disposed as the rotating drive mechanism that is the vibrating means. Like reference numerals refer to the same composition members, and the detailed explanation is omitted.

In the filter device 50 of this embodiment, as shown in FIG. 19, as well as embodiment 3 shown in FIG. 8-FIG. 9, the rotation magnet 72 for drive is connected with drive shaft side of the rotation motor and the magnet 74 for rotation is connected with the shank 66*c* of the filter 66. As a vibrating means, by magnet coupling of this rotation magnet 72 for drive and this magnet 74 for rotation, the filter 66 is rotated by the drive rotation motor 70.

In addition, between the rotation magnet 72 for drive and magnet 74 for rotation, the partition member 76 to airtightly separate between rotation mechanism accommodating portions 62 is disposed.

Moreover, in the filter device 50 of this embodiment as shown by E portion of FIG. 19, the drive shaft 70*a* of the rotation motor 70 and the shaft portions 66*c* of the filter 66 are connected mutually in a state of eccentricity.

In this case, by operating the rotation motor 70 and by rotating the drive shaft 70*a* of the rotation motor 70, the rotation magnet 72 for drive is rotated. As a result, the magnet 74 for rotation, which construct the magnet coupling with this the rotation magnet 72 for drive, is rotated by function of magnetism.

In this case, as shown in FIG. 20, the drive shaft 70*a* of the rotation motor 70 and the shaft portions 66*c* of the filter 66 are connected mutually in the state of eccentricity. Consequently, the filter 66 is vibrated by rotation eccentricity, as shown by the solid line of FIG. 20, compared with the usual rotation (dotted line). As a result, a vibration that is combination of a centrifugal force by rotation and a centrifugal force by eccentricity is generated.

Thus, by composing like this, by rotating of the rotating drive mechanism, the filter 66, which is connected with the rotation shaft of the rotating drive mechanism in the state of eccentricity, is vibrated by rotation eccentricity. As a result, by the vibration that is combination of a centrifugal force by rotation and the centrifugal force by eccentricity, the filter 66 is vibrated. Therefore, the moisture content that adheres to filter 66 can be flicked out by the vibration and be removed more efficiently.

[Embodiment 8]

Figure 21:
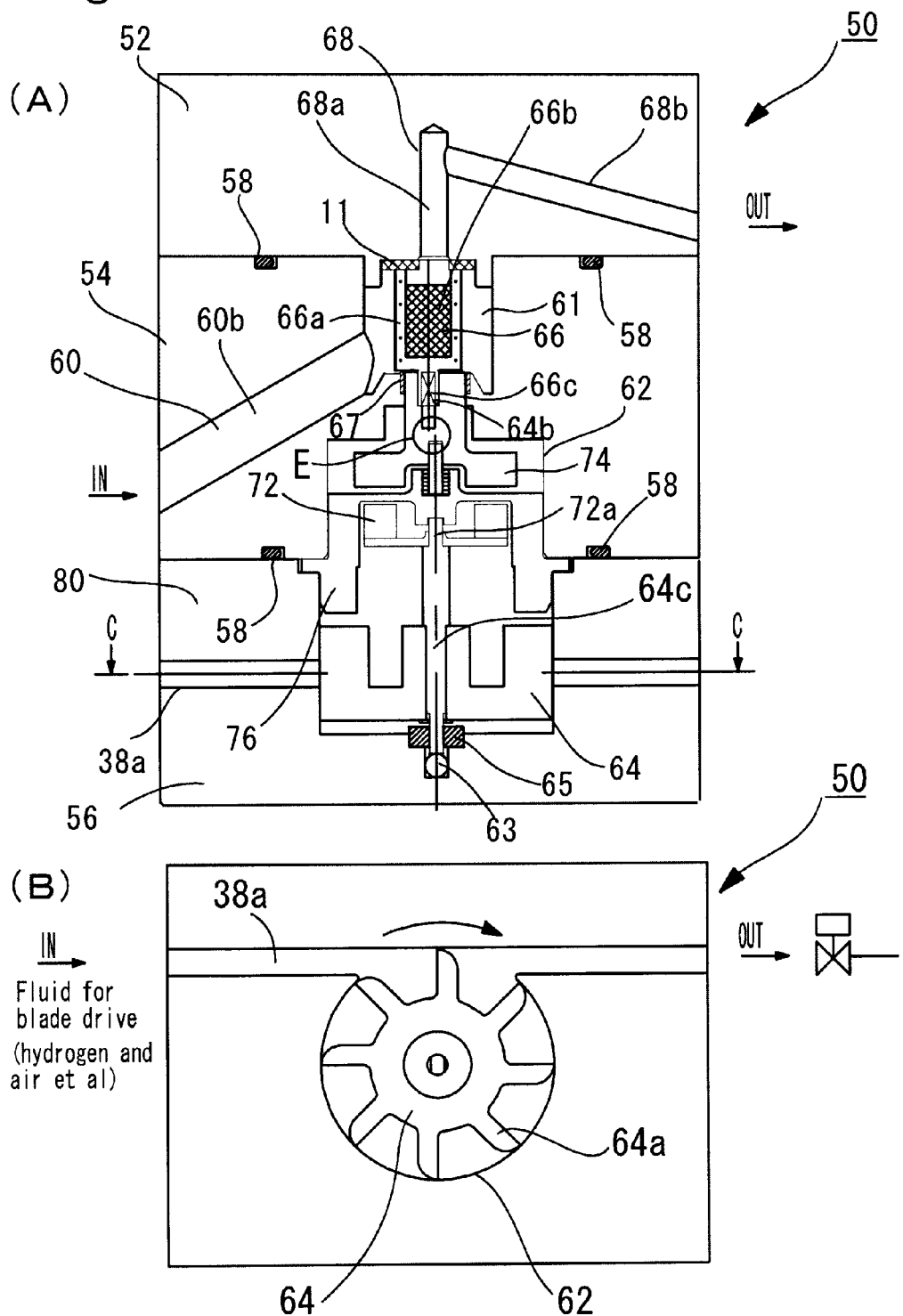
FIG. 21(A) is a schematic longitudinal sectional view of another embodiment of the filter device of the invention and FIG. 21(B) is a schematic cross-sectional view in the C-C line of the filter device of FIG. 21(A).

FIG. 21(A) is a schematic longitudinal sectional view of another embodiment of the filter device of the invention and FIG. 21(B) is a schematic cross-sectional view in the C-C line of the filter device of FIG. 21(A).

In the filter device 50 of this embodiment, the composition similar to the filter device 50 of embodiment 4 shown in FIG. 10-FIG. 13. Like reference numerals refer to the same composition members, and the detailed explanation is omitted.

In the filter device 50 of this embodiment, as shown in FIG. 21(A), as well as embodiment 4 shown in FIG. 10-FIG. 13, in the lower housing 56, the blade member 64, which composes the rotation mechanism as the vibrating means, is accommodated rotatably by the bearing 65 and the ball 63.

Furthermore, a plurality of the blades 64*a* are formed in this blade member 64. Consequently, as a fluid for rotation drive, by the cooling fluid introduced into the cooling fluid divergence path 38*a* that diverges from the cooling fluid circulation path 38, the blade member 64 is rotated in the direction indicated by the arrow of FIG. 21(B). In addition, the cooling fluid introduced into this cooling fluid divergence path 38*a* is returned to the cooling fluid circulation path 38 again.

Moreover, in the filter device 50 of this embodiment, as well as the filter device 50 of embodiment 3 shown in FIG.

8-FIG. 9, the rotation magnet 72 for drive is connected to the side of the blade member 64 and the magnet 74 for rotation is connected with the shank 66c of the filter 66. With magnet coupling of this rotation magnet 72 for drive and magnet 74 for rotation, the filter 66 is rotated with the cooling fluid.

In addition, between the rotation magnet 72 for drive and the magnet 74 for rotation, the partition member 76 to airtightly separate between the rotation mechanism accommodating portions 62 is disposed.

Moreover, in the filter device 50 of this embodiment, as shown by E portion of FIG. 21(A), a drive shaft 64c of the blade member 64, i.e. a drive shaft 72a of the rotation magnet 72 for drive and the shaft portion 66c of the filter 66 are connected mutually in the state of eccentricity.

In this case, the blade member 64 is rotated with the cooling fluid so that the drive shaft 64c of the blade member 64 is rotated. As a result, the rotation magnet 72 for drive is rotated so that the magnet 74 for rotation, which forms magnet coupling with this rotation magnet 72 for drive, is rotated by function of magnetism.

In this case, as shown in FIG. 21(A), the driving shaft 64c of the blade member 64 and the shank 66c of the filter 66 are connected mutually in the state of eccentricity. Consequently, the filter 66 is vibrated by rotation eccentricity, as shown by the solid line of FIG. 20, compared with the usual rotation (dotted line). As a result, a vibration that is combination of a centrifugal force by rotation and a centrifugal force by eccentricity is generated.

Thus, by composing like this, by rotation of the rotating drive mechanism, the filter 66, which is connected with the rotation shaft of the rotating drive mechanism in the state of eccentricity, is vibrated by rotation eccentricity. As a result, by the vibration that is combination of a centrifugal force by rotation and the centrifugal force by eccentricity, the filter 66 is vibrated. Therefore, the moisture content that adheres to filter 66 can be flicked out by the vibration and be removed more efficiently.

[Embodiment 9]

FIG. 22(A) is a schematic longitudinal sectional view of another embodiment of the filter device of the invention and FIG. 22(B) is a schematic cross-sectional view in the D-D line of the filter device of FIG. 22(A).

In the filter device 50 of this embodiment, the composition similar to the filter device 50 of embodiment 5 shown in FIG. 14-FIG. 16. Like reference numerals refer to the same composition members, and the detailed explanation is omitted.

Figure 22:
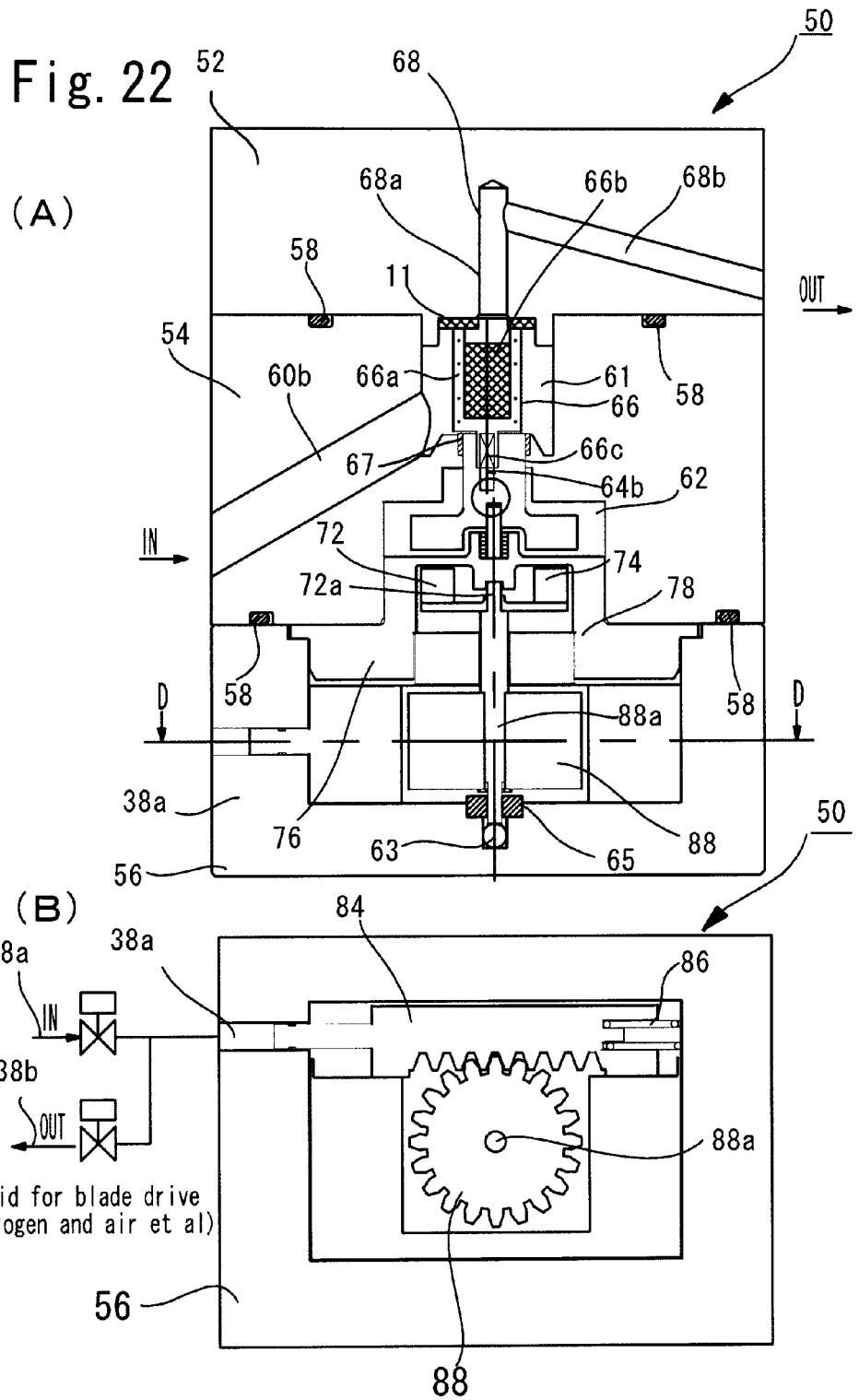
FIG. 22(A) is a schematic longitudinal sectional view of another embodiment of the filter device of the invention and FIG. 22(B) is a schematic cross-sectional view in the D-D line of the filter device of FIG. 22(A).

In the filter device 50 of this embodiment, as shown in FIG. 22(A), as well as embodiment 5 shown in FIG. 14-FIG. 16, in the lower housing 56, as a fluid for rotation drive, the rack member 84, which is reciprocated by the cooling fluid introduced into the cooling fluid divergence path 38a that diverges from the cooling fluid circulation path 38, is provided. In addition, the edge of the rack member 84 is urged, by the spring member 86, to the left side in FIG. 22 (B), that is, to the entrance side of the cooling fluid divergence path 38a.

Moreover, this cooling fluid divergence path 38a, as well as the filter device 50 of the embodiment shown in FIG. 14-FIG. 16, is returned to the cooling fluid circulation path 38.

In addition, a pinion member 88, which is connected to the filter 66 and is engaged with the rack member 84 and is rotated by movement of the rack member 84, is provided.

Moreover, as well as embodiment 5 shown in FIG. 14-FIG. 16, by controlling of the fluid control device 90 that controls the introducing of cooling water and that is disposed in the cooling fluid divergence path 38a, the rotation of the pinion member 88 is controlled by the movement of the rack member 84.

By composing like this, by the cooling fluid introduced into cooling fluid divergence path 38a, against the spring member 86, the rack member 84 is moved to the right side in FIG. 22(B), i.e. to the opposite side to the entrance side of the cooling fluid divergence path 38a. Moreover, by stopping introduction of the cooling fluid and exhausting the cooling fluid, with the urging power of the spring member 86, to the left side in FIG. 22(B), i.e. to the entrance side of the cooling fluid divergence path 38a, the rack member 84 is moved. As a result, the pinion member 88 is rotated by moving these rack members 84.

In this embodiment like this, the vibrating means is composed by the rack member 84, the pinion member 88, and the pinion member 88 that engages with the rack member 84 and that is rotated by the moving rack member 84.

In addition, in the filter device 50 of this embodiment, as shown by E portion of FIG. 22(A), the drive shaft 88a of the pinion member 88, i.e. the drive shaft 72a of the rotation magnet 72 for drive and the shaft portion 66c of the filter 66 are connected mutually in the state of eccentricity.

In this case, as shown in FIG. 22, the drive shaft 88a of the pinion member 88 and the shaft portion 66c of the filter 66 are connected mutually in the state of eccentricity. Consequently, the filter 66 is vibrated by rotation eccentricity, as shown by the solid line of FIG. 20, compared with the usual rotation (dotted line). As a result, a vibration that is combination of a centrifugal force by rotation and a centrifugal force by eccentricity is generated.

Thus, by composing like this, by rotation of the rotating drive mechanism, the filter 66, which is connected with the rotation shaft of the rotating drive mechanism in the state of eccentricity, is vibrated by rotation eccentricity. As a result, by the vibration that is combination of a centrifugal force by rotation and the centrifugal force by eccentricity, the filter 66 is vibrated. Therefore, the moisture content that adheres to filter 66 can be flicked out by the vibration and be removed more efficiently.

[Embodiment 10]

Figure 23:
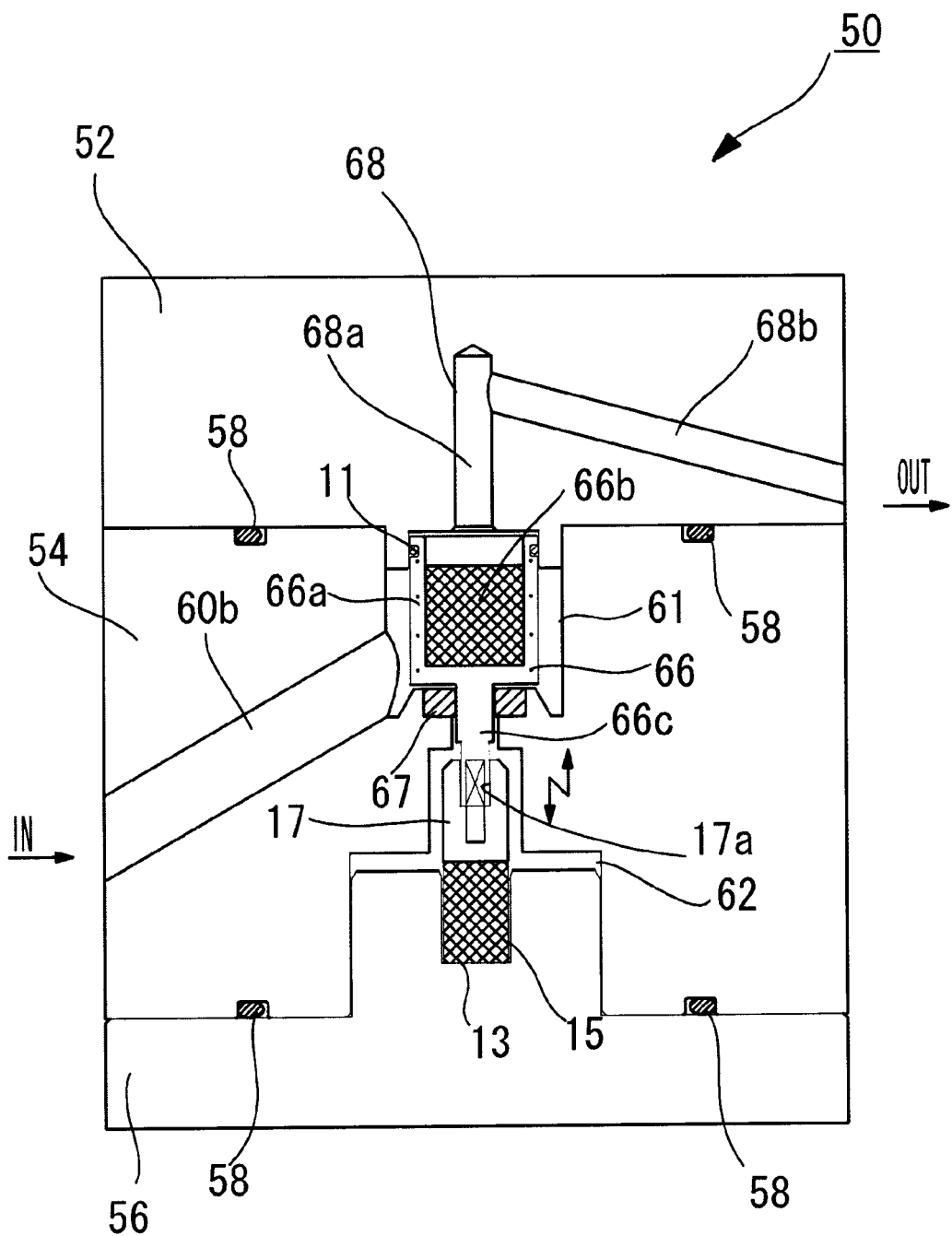
FIG. 23 is a schematic longitudinal sectional view of another embodiment of the filter device of the invention.

FIG. 23 is a schematic longitudinal sectional view of another embodiment of the filter device of the invention.

In the filter device 50 of this embodiment, the composition similar to filter device 50 of embodiment 1 shown in FIG. 1-FIG. 3. Like reference numerals refer to the same composition member, and the detailed explanation is omitted.

In the filter device 50 of this embodiment, as shown in FIG. 23, instead of the blade member 64 of the filter device 50 shown in embodiment 1 shown in FIG. 1-FIG. 3, a piezo-electric element accommodating portion 13 is formed in the lower housing 56.

In addition, a piezo-electric element 15 is disposed in this piezo-electric element accommodating portion 13. Moreover, the shaft portion 66c of the filter 66 is engaged with a shaft hole 17a, which is formed at the center of the upper portion of the vibration portion 17 of this piezo-electric element 15.

Thus, the piezo-electric element 15 is disposed as a vibrating means so that by applying the current to the piezo-electric element 15, the vibration of the vibration portion 17 of the piezo-electric element 15 is transmitted as a vertical vibration. As a result, the filter 66 can be vertically vibrated as shown by the arrow of FIG. 23. Therefore, by the vertical vibration of this filter 66, the moisture content that adheres to the filter 66 can be flicked out vertically by the vibration and can be efficiently removed.

Moreover, since it is enough to dispose the piezoelectric element 15, other piping is unnecessary, and the power consumption to the piezoelectric element 15 is little so that a cheap and compact filter device can be provided.

[Embodiment 11]

Figure 24:
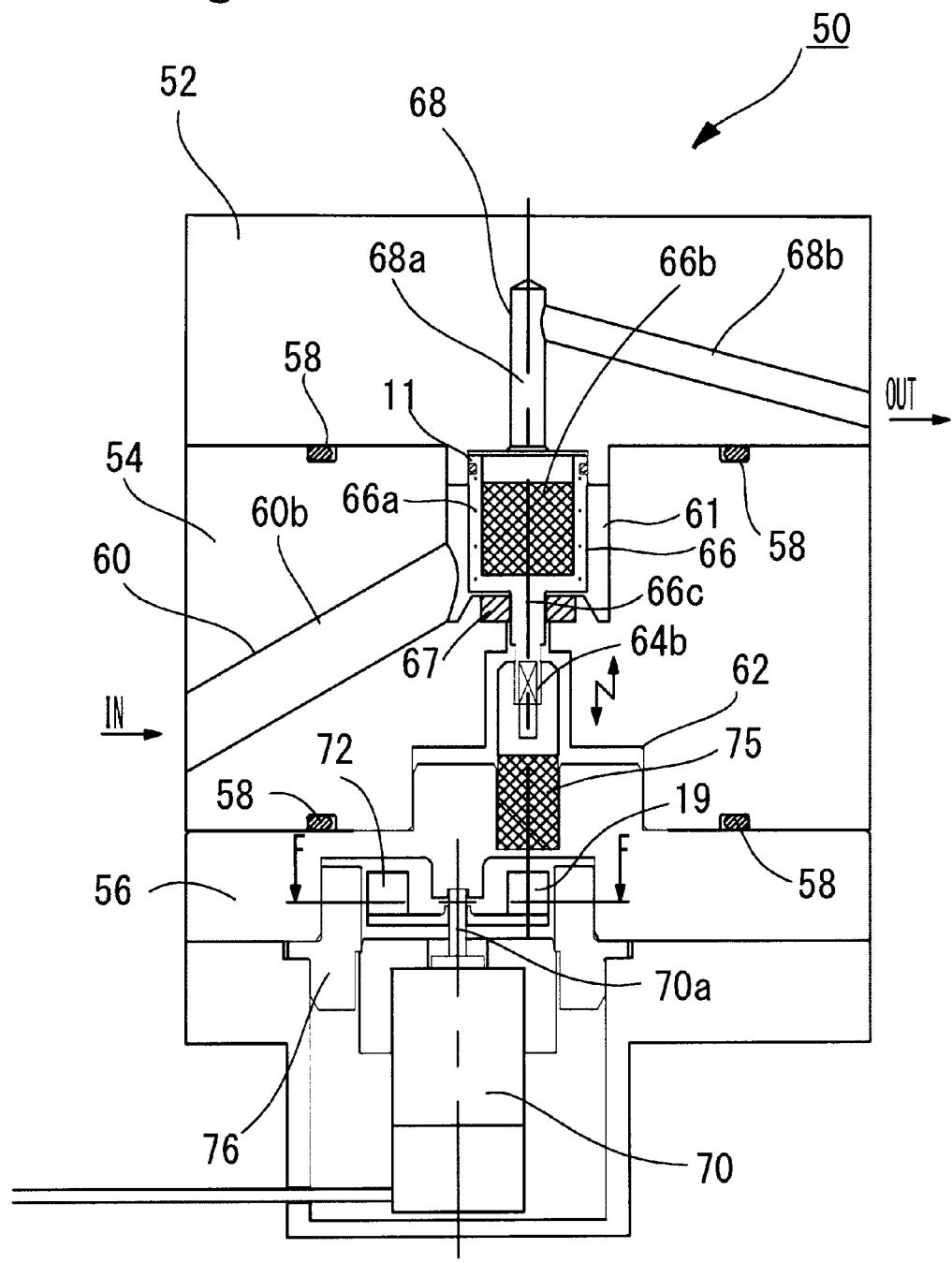
FIG. 24 is a schematic longitudinal sectional view of another embodiment of the filter device of the invention.
Figure 25:
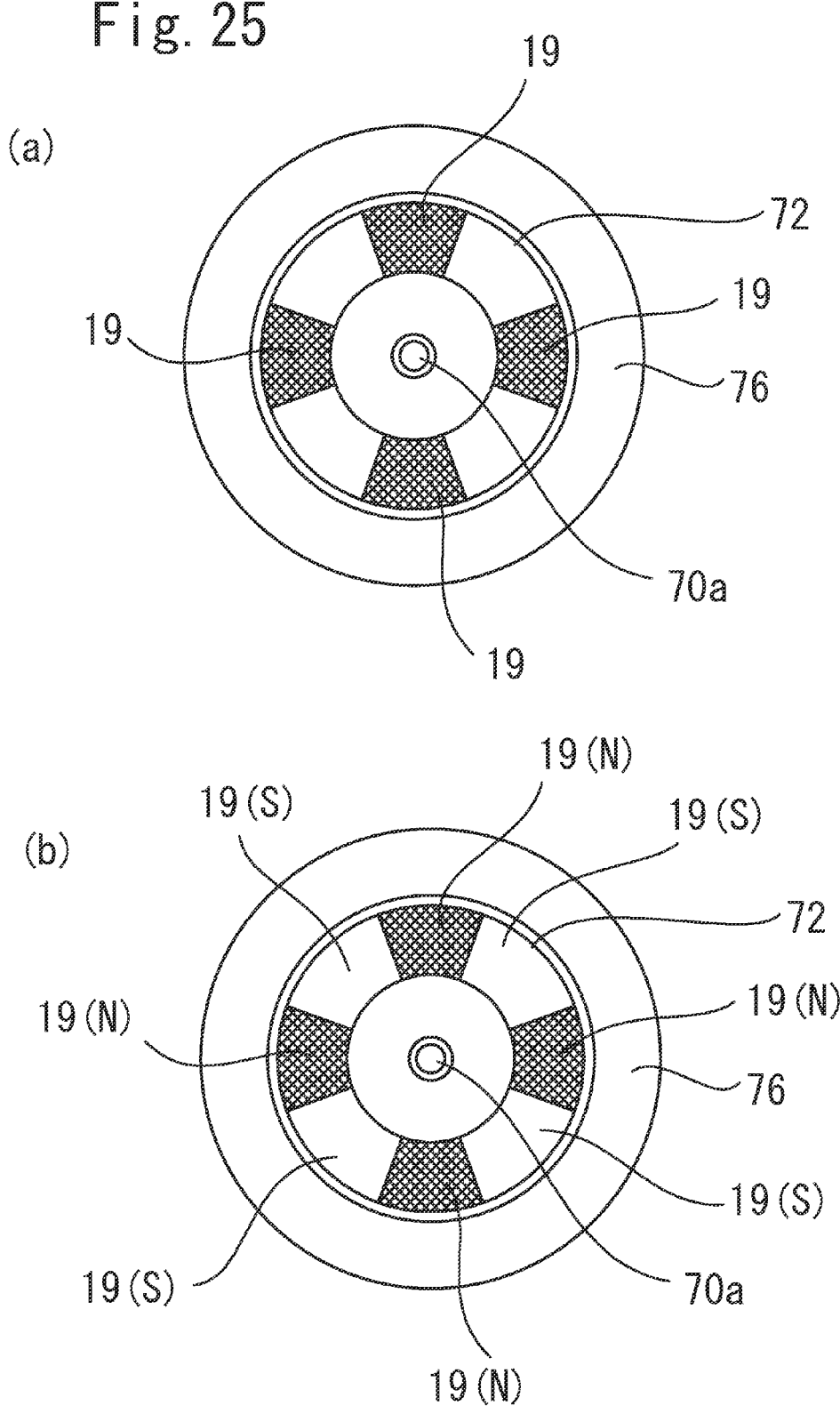
FIG. 25 is a schematic cross-sectional view in the F-F line of the filter device of FIG. 24.

FIG. 24 is a schematic longitudinal sectional view of another embodiment of the filter device of the invention. FIG. 25 is a schematic cross-sectional view in the F-F line of the filter device of FIG. 24.

In the filter device 50 of this embodiment, the composition similar to filter device 50 of embodiment 3 shown in FIG. 8-FIG. 9. Like reference numerals refer to the same composition members, and the detailed explanation is omitted.

In the filter device 50 of this embodiment, as shown in FIG. 24, as well as the filter device 50 of embodiment 3 shown in FIG. 8-FIG. 9, a composition basically similar to the embodiment in which the rotation motor 70 is disposed as a rotating drive mechanism that is the vibrating means. Like reference numerals refer to the same composition members, and the detailed explanation is omitted.

In the filter device 50 of this embodiment, as shown in FIG. 24, a magnet 75 for vibration having a small diameter is connected with the shank 66c of the filter 66.

In addition, to have a position in which the drive shaft 70a of the rotation motor 70 and the shaft portion 66c of filter 66 shifted, the rotation motor 70 is disposed to the left side in FIG. 24.

Moreover, on the rotation magnet 72 for drive having a disk shape, which is connected with the drive shaft 70a of the rotation motor 70, as shown in FIG. 25(A), a plurality of drive side magnets 19 (four in total in this embodiment) are disposed.

In this case, the magnet 75 for vibration that is connected to the shank 66c of the filter 66 and the drive side magnet 19 placed in the rotation magnet 72 for drive that is connected with the drive shaft 70a of the rotation motor 70 are disposed so that the opposite magnetic poles of the magnets face to each other.

Moreover, a plurality of drive side magnets 19 are disposed separately from each other at constant intervals in the circumferential direction of the rotation magnet 72 for drive (i.e. direction of the rotation) in this embodiment (i.e. separately from each other at 90° of the central angle).

Moreover, as shown in FIG. 24 and FIG. 25(A), when the drive shaft 70a of the rotation motor 70 is rotated and the rotation magnet 72 for drive is rotated, these drive side magnets 19 is disposed so as to face mutually at a lower position corresponding to the magnet 75 for vibration that is connected with the shanks 66c of the filter 66.

By composing like this, the rotation motor 70 is operated so that the rotation magnet 72 for drive having a disk shape connected with the driving shaft 70a of the rotation motor 70 is rotated.

As a result, with the rotation of the rotation magnet 72 drive, the drive side magnet 19 placed in the rotation magnet 72 for drive is rotated in the circumferential direction of the rotation magnet 72 for drive.

As a result, at the position that the drive side magnet 19 on the side of the rotation motor 70 and the magnets 75 for vibration of the filter 66 side are confronted each other, since the magnetic poles of these magnets are opposite, power for repulsion is caused, and the filter 66 is moved upwardly.

Moreover, at the position that the drive side magnet 19 on the side of the rotation motor 70 and the magnets 75 for vibration of the filter 66 side are not confronted each other, the above repulsion power is canceled, and the filter 66 is moved downwardly for its own weight.

As mentioned above, by the repulsion power of the magnets 75 for vibration of the filter 66 side and the drive side magnet 19 of the rotation motor 70 side, the filter 66 can be vertically vibrated. As a result, by the vertical vibration of this filter 66, the moisture content that adheres to the filter 66 can be vertically flicked out and can be efficiently removed.

Moreover, it is enough to dispose the magnets 75 for vibration of the filter 66 side and the drive side magnet 19 of the rotation motor 70 side. As a result, since other piping and the power supply are unnecessary, a cheap and compact filter device can be provided.

Moreover, the drive side magnet 19 at the side of the rotation motor 70 is formed partially on the rotational direction (i.e. circumferential direction) of the rotation magnet 72 for drive that is the rotation body connected with the rotation motor 70. As a result, according to the rotational speed of the rotation magnet 72 for drive that is the rotation body (i.e. rotational speed of the rotation motor 70), the filter 66 can be vertically vibrated at a predetermined frequency and intervals of time.

In addition, in this embodiment, a plurality of drive side magnets 19 are disposed separately from each other at constant intervals in the circumferential direction of the rotation magnet 72 for drive (i.e. direction of the rotation) in this embodiment (i.e. separately from each other at 90° of the central angle). However, the number of the drive side magnets 19 may be one or more and it is not especially limited. Moreover, the separate interval (i.e. separate angle) can be changed arbitrarily in proportion to the desired number of the vertical vibrations of the filter 66.

Moreover, in this embodiment. a plurality of the drive side magnets 19 are disposed separately from each other at constant intervals in the circumferential direction of the rotation magnet 72 for drive (i.e. direction of the rotation). However, as shown in FIG. 25(B), a plurality of these drive side magnets 19 can be disposed continuously such that the magnetic poles that faces to the magnet 75 for vibration on the side of the filter 66 are different from each other in the circumferential direction of the rotation magnet 72 for drive (i.e. direction of the rotation) or are separated at constant intervals (not shown).

In this case, at the position that the magnetic poles are the same where the drive side magnet 19 on the side of the rotation motor 70 and magnets 75 for vibration on the side of filter 66 are faced and adsorbed each other, the above-described repulsion power is canceled. As a result, the filter 66 moves to the lower side immediately not by its own weight but by the adsorptive power.

Therefore, the filter 66 can be vibrated vertically more efficiently so that the moisture content which is adhered to the filter 66 is flicked out vertically by the vertical vibration of the filter and the moisture content can be more effectively removed.

Moreover, in this case, vertical vibration time can be changed by changing the size of the circumferential direction of a plurality of drive side magnet 19. By the intermittent and vertical vibration of this filter 66, the moisture content which is adhered to the filter 66 is flicked out vertically by the vertical vibration of the filter so that the moisture can be more effectively removed.

In the filter device 50 of this embodiment, in the rotational direction of the rotation magnet 72 for drive having a disk shape which is connected with drive shaft 70a of the rotation motor 70, a plurality of the drive side magnets 19 are disposed. As a result, by rotation of the rotation magnet 72 for drive, the repulsion power is generated against the magnet 75 for vibration which is connected to the shank 66c of the filter 66 so that the filter 66 is vertically vibrated.

However, if a composition is such that the repulsion power is generated by the driving side magnet 19 against the magnet 75 for vibration and the filter 66 is vibrated vertically, without the rotation motor 70, for instance, as the filter device 50 of Embodiment 4 shown in FIG. 10-FIG. 13, Embodiment 5 shown in FIG. 14-FIG. 16, and the filter device 50 of Embodiment 8, the blade member 64 and the pinion member 88 can be rotated by the cooling fluid introduced into the cooling fluid divergence path 38a. As a result, the rotation magnet 72 for drive connected with these blade members 64 and the pinion member 88 can be rotated (not shown).

In addition, if a composition is such that the repulsion power is generated by the driving side magnet 19 against the magnet 75 for vibration and filter 66 is vibrated vertically, not the rotation magnet 72 for drive having a disk shape, but the magnet 72 having a rectangular plate shape (not shown) is utilized so that the driving side magnet 19 can be disposed on the part thereof.

In this case, instead of Embodiment 5 shown in FIG. 14-FIG. 16, and the reciprocated rack member 84 of the filter device 50 of embodiment 8, the magnet 72 having a rectangular plate shape is disposed (not shown). As a result, they are reciprocated by the cooling fluid introduced into the cooling fluid divergence path 38a and the repulsion power is generated by the driving side magnet 19 against the magnet 75 for vibration so that the filter 66 can be vibrated vertically.

Although preferable embodiments of the invention are described above, the invention is not limited to these embodiments. For instance, in the filter device 50 of Embodiment 4 shown in FIG. 10-FIG. 13, Embodiment 5 shown in FIG. 14-FIG. 16, and the filter device 50 of Embodiment 8, by the cooling fluid introduced into the cooling fluid divergence path 38a, the blade member 64 and the pinion member 88 are rotated. However, by separately introducing air as a fluid for rotation drive, it is also possible to rotate the blade member 64 and the pinion member 88. Therefore, various changes are possible in the scope that does not deviate from the object of the invention.

Figure 26:
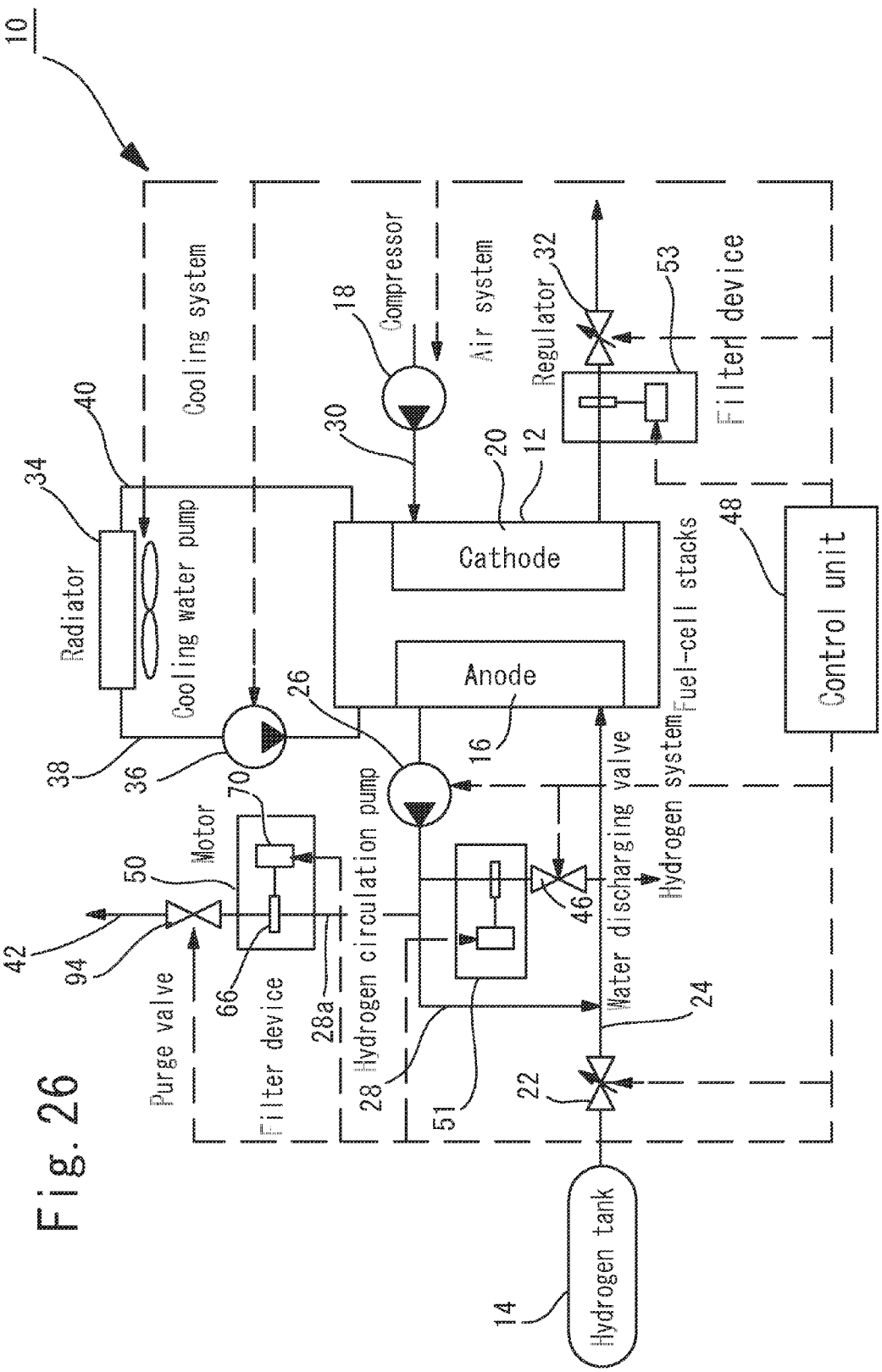
FIG. 26 is a schematic view of the fuel cell system to which the filter device of another embodiment of the invention is applied.

Though the embodiment in which the filter device 50 of the invention is disposed on the upstream sides of the purge valves 44 and 94 has been described above. However, the invention is not limited to this and for instance, as shown in FIG. 26, a similar effect is achieved even if it is disposed on the upstream side of the water discharging valve 46 and the upstream side of the regulator 32.

Industrial Applicability

The invention relates to a filter device disposed in the moist fluid passage of the fuel cell system. In particular, the invention relates to the filter device disposed to the upstream side of the purge valve that opens and shuts the passage of the moist fluid, and relates to a suitable filter device as a filter to remove the foreign substance in the fluid.

Reference Signs List
10 Fuel cell system
11 Sealing member
12 Fuel-cell stacks
13 Piezo-electric element accommodating portion
14 Hydrogen tank
15 Piezoelectric element
16 Anode
17 Vibration portion
17a Shaft bore
18 Compressor
19 Driving side magnet
20 Cathode
22 Hydrogen pressure adjustment valve
24 Hydrogen supply passage
26 Hydrogen circulation pump
28 Hydrogen circulation passage
28a Divergence path
30 Air supply passage
32 Air pressure adjustment valve
34 Radiator
36 Cooling water pump
38 Cooling fluid circulation passage
38a Cooling fluid divergence passage
42 Discharge passage
44 Purge valve
46 Water discharging valve
48 Control unit
50 Filter device
52 Upper housing
54 Intermediate housing
56 Lower housing
58 Sealing member
60 Fluid introducing path
60a First fluid introducing path
60b Second fluid introducing path
60c Sealing member
61 Filter chamber
62 Rotation mechanism accommodating portion
63 Ball
64 Blade member
64a Blade
64b Shaft bore
64c Driving shaft
65 Bearing
66 Filter
66a Filter portion
66b Filter member
66c Shank
67 Bearing
68 Fluid discharge path
68a First fluid discharge path
68b Second fluid discharge path
70 Rotation motor
70a Driving shaft
72 Rotation magnet drive
72a Driving shaft 74 Magnet for rotation
75 Magnet for vibration
76 Partition member
78 Sealing member
80 Leak fluid discharge path
82 Fluid control device
84 Rack member
86 Spring member
88 Pinion member
88a Driving shaft
90 Fluid control device
94 Purge valve
96 Valve entrance
100 Fuel cell system
102 Fuel cell stack
104 Hydrogen tank
106 Anode
108 Compressor
110 Cathode
112 Hydrogen pressure adjustment valve
114 Hydrogen supply passage
116 Hydrogen circulation pump
118 Hydrogen circulation passage
120 Air supply passage
122 Air pressure adjustment valve
124 Radiator
126 Cooling water pump
128 Cooling water circulation path 132 Discharge path
134 Purge valve

The invention claimed is:

1. A filter device disposed in a discharge path of a moist fluid passage, in which a reactive gas containing a moisture content is exhausted from a fuel-cell stack of a fuel cell system, the filter device comprising:
   a fluid introducing path which introduces a fluid that flows in the discharge path;
   a filter to permeate the fluid introduced from the fluid introducing path and remove foreign matter in the fluid;
   a fluid discharge path which discharges the fluid that passed the filter; and
   vibrating means that vibrates the filter wherein the vibration means is a rotating driving mechanism which is connected to the filter so as to rotate and vibrate the filter, or an eccentric rotating mechanism that rotates the filter eccentrically,
   wherein the moisture content that adheres to the filter is flicked out toward the fluid introducing path and is removed by rotation of the filter by the rotating driving mechanism, or by eccentric rotation by the eccentric rotating mechanism.

2. The filter device as defined in claim 1, wherein the rotating driving mechanism is a blade member which is disposed in the fluid introducing path and is rotated by the fluid introduced into the fluid introducing path.

3. The filter device as defined in claim 1, wherein the rotating driving mechanism is a rotation motor.

4. The filter device as defined in claim 3, wherein the filter device comprises:
   a rotation magnet for drive which is connected to the rotating driving mechanism side; and
   a magnet for rotation which is connected to the filter, and the filter device is characterized in that the filter is rotated by magnet coupling between the rotation magnet for drive and the magnet for rotation.

5. The filter device as defined in claim 4, wherein a partition member for airtightly separating the rotation magnet for drive and the magnet for rotation is disposed between the rotation magnet for drive and the magnet for rotation.

6. The filter device as defined in claim 1, wherein the rotating driving mechanism is a blade member that rotates by introducing a fluid for rotation drive.

7. The filter device as defined in claim 1, wherein the rotating driving mechanism comprises:
   a rack member which reciprocates by introducing the fluid for rotation drive, and
   a pinion member which is connected to the filter and is rotated by a movement of the rack member by being engaged with the rack member.

8. The filter device as defined in claim 6, wherein the fluid for rotation drive is introduced through a cooling fluid divergence path that diverges from a cooling fluid circulation path.

9. The filter device as defined in claim 1, wherein the rotating eccentric mechanism is configured to rotate and vibrate the filter eccentrically such that a rotation shaft of the filter and a rotation shaft of the rotating driving mechanism are connected mutually in a state of eccentricity.

10. The filter device as defined in claim 1, wherein a purge valve is integrally disposed at a filter side of the fluid discharge path.

11. The filter device as defined in claim 1, wherein the filter is of a disk shape or a cylindrical shape.

12. The filter device as defined in claim 7, wherein the fluid for rotation drive is introduced through a cooling fluid divergence path that diverges from a cooling fluid circulation path.

13. The filter device as defined in claim 4, wherein the rotating eccentric mechanism is configured to rotate and vibrate the filter eccentrically such that a rotation shaft of the filter and a rotation shaft of the rotating driving mechanism are connected mutually in a state of eccentricity.

14. The filter device as defined in claim 7, wherein the rotating eccentric mechanism is configured to rotate and vibrate the filter eccentrically such that a rotation shaft of the filter and a rotation shaft of the rotating driving mechanism are connected mutually in a state of eccentricity.

15. The filter device as defined in claim 4, wherein a purge valve is integrally disposed at a filter side of the fluid discharge path.

16. The filter device as defined in claim 7, wherein a purge valve is integrally disposed at a filter side of the fluid discharge path.

* * * * *